US011974013B2

(12) United States Patent
Dabbiru et al.

(10) Patent No.: US 11,974,013 B2
(45) Date of Patent: *Apr. 30, 2024

(54) MODIFYING DIGITAL VIDEO CONTENT

(71) Applicant: GOOGLE LLC, Mountain View, CA (US)

(72) Inventors: Lakshmi Dabbiru, Sunnyvale, CA (US); Indusekar Ponnapa Reddy, Fremont, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/881,262

(22) Filed: Aug. 4, 2022

(65) Prior Publication Data
US 2022/0377412 A1 Nov. 24, 2022

Related U.S. Application Data

(63) Continuation of application No. 17/325,065, filed on May 19, 2021, now Pat. No. 11,412,293, which is a
(Continued)

(51) Int. Cl.
H04N 21/44 (2011.01)
G11B 27/34 (2006.01)
(Continued)

(52) U.S. Cl.
CPC ....... H04N 21/44016 (2013.01); G11B 27/34 (2013.01); H04N 21/23418 (2013.01);
(Continued)

(58) Field of Classification Search
CPC ....... H04N 21/44016; H04N 21/23418; H04N 21/435; H04N 21/437; H04N 21/8126;
(Continued)

(56) References Cited

U.S. PATENT DOCUMENTS 11,044,521 B2 6/2021 Dabbiru et al.
11,412,293 B2 8/2022 Dabbiru et al.
(Continued)

FOREIGN PATENT DOCUMENTS

CN 102339625 A 2/2012
CN 102907093 A 1/2013
(Continued)

OTHER PUBLICATIONS

Examination Report for EP Appln. Ser. No. 17826024.6 dated May 10, 2021 (7 pages).
(Continued)

Primary Examiner — Anthony Bantamoi
(74) Attorney, Agent, or Firm — MARSHALL, GERSTEIN & BORUN LLP

(57) ABSTRACT

Systems and methods of combining digital video are described. A system can receive digital video comprising frames. The system can analyze the frames to identify a subset of consecutive frames that have a static portion defined by a spatial region with matching pixels across two or more frames. The system can tag the digital video with an indication of the subset and a trigger that causes transmission, at a temporal offset during playback prior to the subset, of a request for content used to overwrite the static portion. The system can receive the request from the client device, the request transmitted by the client device based on the temporal offset during playback prior to the subset. The system can select and transmit a content item responsive to the request to cause the client device to render the content item at the static portion of the subset.

26 Claims, 7 Drawing Sheets

Related U.S. Application Data continuation of application No. 16/625,576, filed as application No. PCT/US2017/065381 on Dec. 8, 2017, now Pat. No. 11,044,521.

(51) Int. Cl.
*H04N 21/234* (2011.01)
*H04N 21/435* (2011.01)
*H04N 21/437* (2011.01)
*H04N 21/81* (2011.01)
*H04N 21/845* (2011.01)

(52) U.S. Cl.
CPC ......... *H04N 21/435* (2013.01); *H04N 21/437* (2013.01); *H04N 21/8126* (2013.01); *H04N 21/8455* (2013.01)

(58) Field of Classification Search
CPC .......... H04N 21/8455; H04N 21/4722; H04N 21/47205; G11B 27/34
See application file for complete search history.

(56) References Cited

U.S. PATENT DOCUMENTS

| | | | |
|---|---|---|---|
| 2006/0026628 A1* | 2/2006 | Wan | H04N 7/10 |
| 2010/0043046 A1 | 2/2010 | Sen et al. | |
| 2010/0154007 A1 | 6/2010 | Touboul et al. | |
| 2010/0205049 A1 | 8/2010 | Long et al. | |
| 2011/0080521 A1* | 4/2011 | Hardacker | H04N 5/50 |
| 2011/0145430 A1 | 6/2011 | Ha et al. | |
| 2016/0142747 A1 | 5/2016 | He et al. | |
| 2017/0024614 A1 | 1/2017 | Sanil et al. | |

FOREIGN PATENT DOCUMENTS

| | | |
|---|---|---|
| CN | 107251008 A | 10/2017 |
| GB | 2 416 949 A | 2/2006 |
| JP | 2010-504044 A | 2/2010 |
| JP | 2011-526754 A | 10/2011 |
| JP | 2012-010117 A | 1/2012 |

OTHER PUBLICATIONS

Examination Report for EP Appln. Ser. No. 17826024.6 dated Nov. 10, 2020 (7 pages).
Examination Report for IN Appln. Ser. No. 201927047406 dated Apr. 16, 2021 (6 pages).
First Office Action for CN Appln. Ser. No. 201780091424.5 dated May 8, 2021 (13 pages).
International Preliminary Report on Patentability, Ch. I, for PCT Appln. Ser. No. PCT/US2017/065381 dated Jun. 18, 2020 (10 pages).
International Search Report and Written Opinion for PCT Appln. Ser. No. PCT/US2017/065381 dated Mar. 22, 2018 (12 pages).
Notice of Allowance for U.S. Appl. No. 16/625,576 dated Feb. 22, 2021 (8 pages).
Office Action for KR Appln. Ser. No. 10-2019-7034916 dated Sep. 17, 2020 (6 pages).
Reasons for Rejection for JP Appln. Ser. No. 2019-565935 dated Mar. 22, 2021 (4 pages).
Summons to Attend Oral Proceedings for European Application No. 17826024.6, dated Apr. 4, 2023.
Chinese Office Action for Application No. 202111107479.5, dated Feb. 26, 2024.

* cited by examiner

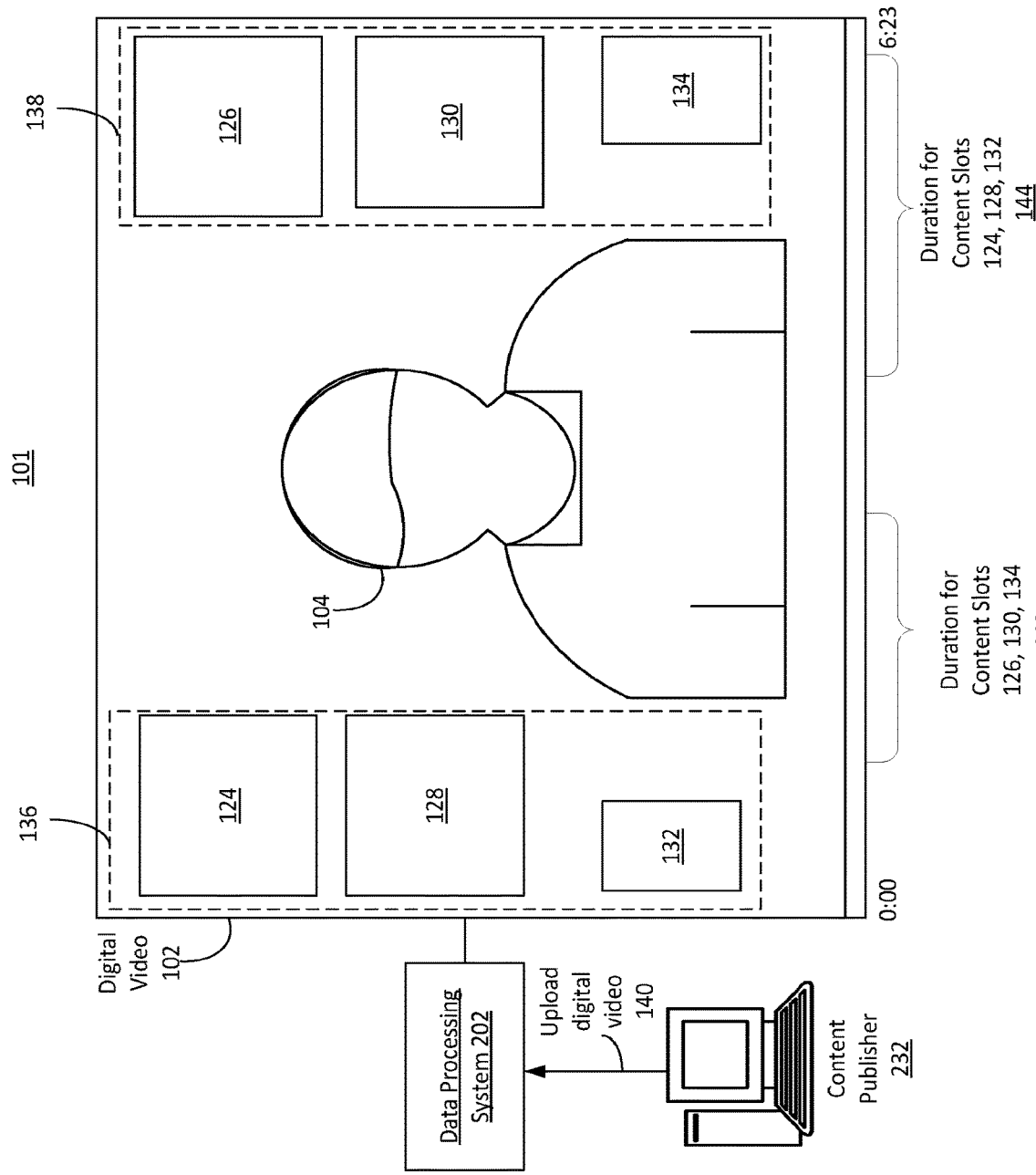

MODIFYING DIGITAL VIDEO CONTENT

CROSS-REFERENCE TO RELATED APPLICATIONS

The present application claims priority to and is a continuation of U.S. patent application Ser. No. 17/325,065, titled "MODIFYING DIGITAL VIDEO CONTENT," filed May 19, 2021; which is a continuation of U.S. patent application Ser. No. 16/625,576, titled "MODIFYING DIGITAL VIDEO CONTENT," filed Dec. 20, 2019; which in turn is a national stage of, filed under 35 U.S.C. 371, of International Patent Application No. PCT/US2017/065381 filed on Dec. 8, 2017 titled "MODIFYING DIGITAL VIDEO CONTENT", the entireties of which are incorporated by reference herein.

BACKGROUND

Supplemental content can be displayed with digital video content, for example, using a banner content item or an instream content item (sometimes referred to as pre-roll, post-roll, or interstitial elements). Banner content items can refer to overlaying the supplemental content item over the digital video for a limited time (e.g. with an opaque or semi-opaque background, in many implementations). Interstitial instream content items can refer to interrupting the digital video for a limited time and displaying the supplemental content item during this time; similarly, pre-roll and post-roll content items may appear respectively before and after the digital video. However, both banner content items and instream content items appear for a limited amount of time and interrupt or at least partially obscure the original digital video. Furthermore, using banner content items and instream content items may cause an increase in bandwidth utilization, memory utilization, and processor utilization because a server may transmit the digital video and then separately transmit the supplemental content item, or extend the duration of the overall rendering by interrupting the digital video. Thus, it may be challenging to provide supplemental content for digital video content for a greater duration and without interrupting the digital video, while also managing computing resource utilization.

SUMMARY

The present disclosure is directed to systems and methods of combining digital multimedia content. In digital video processing, combining two or more sources of digital video content within a single video stream to be provided to a viewer may be desired. For example, it may be desired to modify an original digital video content with supplemental digital video content. The supplemental digital video content may be dynamically selected and may change over time and/or for different viewers of the final digital video content. In this way, for example, the final digital video content can be modified (e.g. for freshness, localization, personalization, etc.) without the need to entirely replace the original digital video content.

Techniques described herein allow for more seamless combination of video content. This in turn allows for provision of supplemental content for a greater duration, with fewer or no interruptions, and while reducing computing resource utilization. For example, the present solution can include a system that receives (e.g. from internal memory or from an external source) a digital video and pre-processes the video to identify static portions in the video. The static portions can be defined by a spatial region in the digital video that has similar or matching pixels across multiple frames in the digital video. The system can automatically create a spatial and/or temporal slot in the digital video based on a characteristic of the identified static portion. For example, the system can create the slot if the identified static portion satisfies a predetermined duration threshold, size, color, position, or other characteristic. To conduct a real-time content selection process for the supplemental content item without introducing further latency or delay in digital video playback, the system can compute a temporal offset during playback prior to the slot that optimizes between real-time content selection and latency reduction in order to select and provide the selected supplemental content item so it can be merged or rendered in the created slot without introducing delay or lag.

Upon identifying the spatial and/or temporal slot and computing the temporal offset, the system can tag the digital video. For example, the system can insert a tag in metadata of the digital video that provides an indication of the spatial and/or temporal slot and the temporal offset. The tag can further provide instructions that cause the client device to generate a request for content at the temporal offset (e.g. pre-fetching the content prior to a rendering or presentation time). The request for content can include parameters provided in the tag, such as the size or position of the spatial and/or temporal content slot, or characteristics that facilitate real-time content selection (e.g., background color, foreground color, keywords associated with the digital video or slot).

The system can tag the digital video and provide the digital video to a client device. The client device can play or render the digital video. For example, an application (e.g., a video player, multimedia player, application programming interface, or web browser) executed by the client device can play, present, or render the digital video. The client device can parse the metadata that includes the tag generated and inserted by the system. The client device can generate and transmit a request responsive to the tag or trigger embedded in the metadata of the digital video. The client device can transmit the request to the system. Thus, the system can receive the request for content from the client device based on the temporal offset in the metadata. Responsive to receiving the request for content, the system can execute a content selection process using parameters associated with the request or the client device. The system can, upon selecting the content item, provide the content item to the client device to cause the client device to render the content item in the slot in the digital video. In some cases, the system can merge the selected content item with the frames corresponding to the static portion forming the content slot, and stream the merged frames of the digital video to the client device. Thus, by automatically generating a slot by identifying a suitable static portion in digital video and tagging the video to cause the client device to transmit a real-time request for content at a temporal offset prior to playback of the slot, the system can provide immersive supplemental content without interrupting the digital video, extending the duration of the video playback, or blocking active portions of the digital video, while reducing delay or latency in providing and rendering the supplemental content item.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIGS. 1A-1D are illustrations of a display interface and interactions with other computing devices, according to various implementation of a system for combining digital video.

Like reference numbers and designations in the various drawings indicate like elements.

DETAILED DESCRIPTION

Figure 1A:
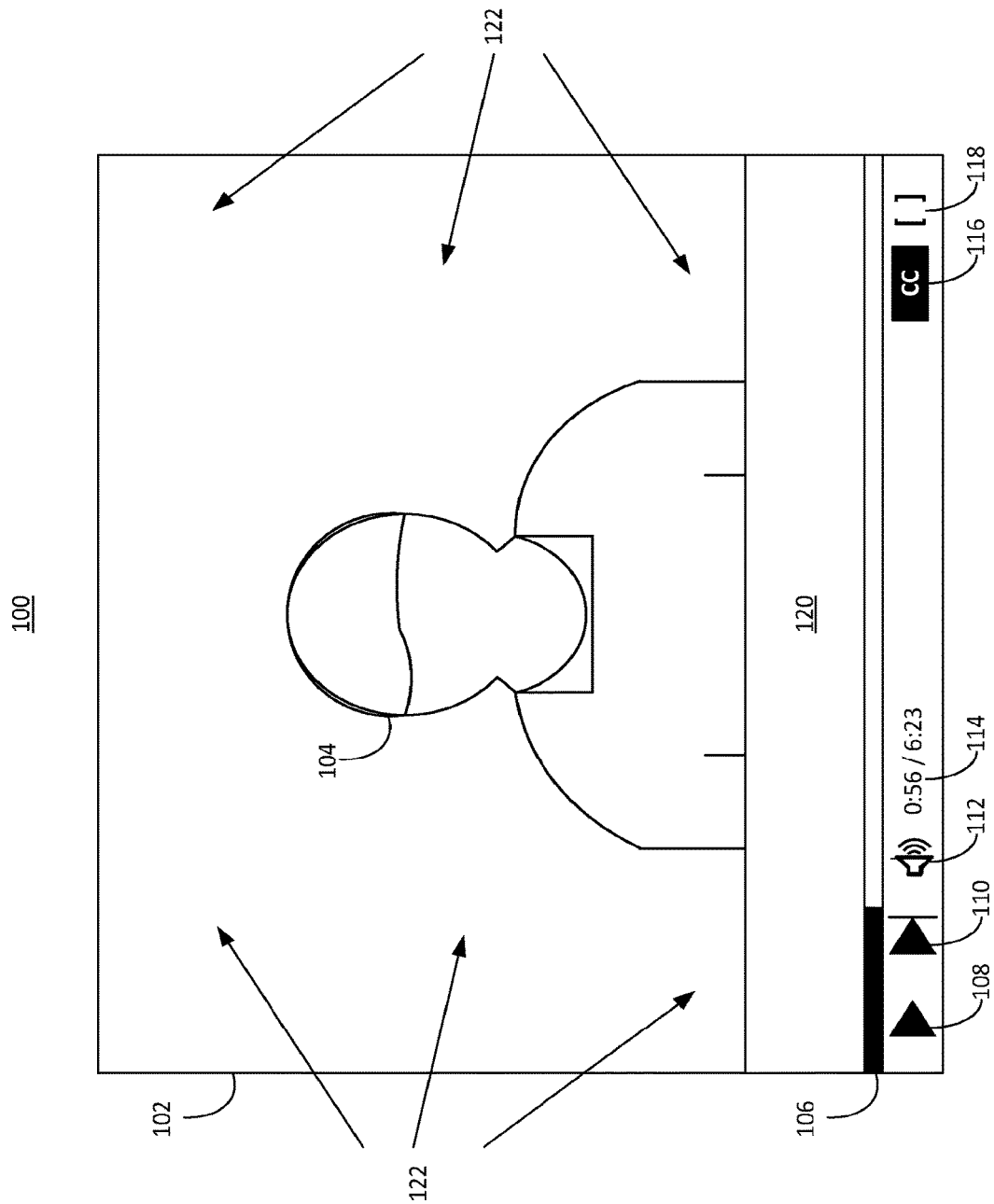

Following below are more detailed descriptions of various concepts related to, and implementations of, methods, apparatuses, and systems of balancing data requests between computing devices and content selection infrastructure over a network. The various concepts introduced above and discussed in greater detail below may be implemented in any of numerous ways.

The present disclosure is directed to systems and methods of combining digital video content to provide supplemental content for a greater duration, with fewer or no interruptions to the digital video, and while reducing computing resource utilization. For example, supplemental video content items provided as overlaid banners in limited fixed positions irrespective of the original video content can block or conceal active or important portions of the digital video, cause extra bandwidth usage by causing the server to provide or transmit extra data for the banner content item, or cause a delay or lag in the playback of the digital video because the data packets corresponding to the banner content item may be prioritized over data packets for the digital video. Further, interstitial supplemental content items provided in-stream can pause playback of the digital video for a duration corresponding to the supplemental content item, thereby interrupting playback of the digital video and extending the duration of the overall digital video (thus requiring additional server resources and bandwidth, tying up the connection and corresponding network sockets, etc.). Additionally, both banner content items and interstitial content items can negatively impact the overall user experience and digital playback graphical user interface.

Systems and methods of the present solution can combining digital videos to provide supplemental content for a greater duration, with fewer or no interruptions to the digital video, and while reducing computing resource utilization. Systems and methods of the present solution can result in greater user attention by immersive embedding of the supplemental content in the digital video. For example, a data processing system of the present solution can receive, via a digital video uploader user interface, a digital video content item. The digital video content item can include multiple frames. The data processing system can provide the video uploader interface to a content publisher device. The content publisher device can transmit, to the data processing system, the digital video content item via the uploader interface. The digital video content item can be formed of multiple consecutive frames, where each frame can include an image. The data processing can pre-process the digital video to determine whether the digital video content item satisfies predetermined minimum standards for further downstream processing (e.g., minimum frame rate, minimum resolution, subject matter, or video encoding protocol). The data processing system can analyze the frames of the digital video content item to identify a subset of frames having a static portion. The static portion can be defined by a spatial region with matching or similar pixels across a temporal region or window (e.g. two or more frames of video), and thus having both spatial and temporal dimensions. The data processing system can determine that the identified static portion is a candidate to be a slot in which a supplemental content item can be inserted via a real-time content selection process.

In some cases, the data processing system can identify multiple candidate slots in the digital video. The data processing system can utilize a machine learning model or algorithm to select one or more of the multiple candidate slots. For example, the data processing system can use a logistic regression, linear regression, artificial neural network, or other machine learning model or algorithm to identify candidate slots. The data processing system can prompt the content publisher device that uploaded the digital video to select one or more of the multiple candidate slots. In some cases, the content publisher device can reject or lock one or more candidate content slots to prevent content item from being inserted into the content slot.

Upon selecting the content slot for the digital video content, the data processing system can generate a tag for insertion into metadata of the digital video content item. The tag can provide information about the automatically generated content slot, such as a size and position of the slot. The tag can include additional information about the content slot that can be used to generate a request for content or facilitate a real-time content selection process that is executed by the data processing system responsive to the request. For example, the data processing system can compute a temporal offset during playback prior to the subset of frames corresponding to the slot. The temporal offset can indicate when the client device is to transmit the request for content to cause the data processing system to execute the content selection process and select a content item to provide for insertion in the content slot in the digital video content item.

The data processing system can provide the tagged digital video content to the client device to cause the client device to playback the digital video content. The client device can render the digital video content, parse the metadata to identify the tag and the temporal offset, and then transmit the request for content responsive to the tag. Responsive to receiving the request, the data processing system can select a content item and provide it to the client device to cause the client device to render the selected content item in the automatically generated slot in the digital video. In some cases, the data processing system can merge the selected supplemental content item with the digital video content and provide or stream the corresponding frames to the client device to cause the client device to render or play the digital video with the supplemental content item. In some cases, the data processing system can provide the supplemental content item to the client device with instructions to cause the client device to render the supplemental content item in the content slot identified in the metadata of the digital video content.

Referring now to FIG. 1A, an illustration of an implementation of a display interface for a system combining or modifying digital video is shown. FIG. 1A illustrates a video player application 100 that plays, renders and presents a digital video content item 102. The video player application 100 can be executed by a client computing device (e.g., client computing device 228 depicted in FIG. 2). The video player application 100 can include one or more video controls, such as a play button 108, which can switch to a pause button during playback in some implementations; a forward button 110; a volume control interface 112; a closed caption toggle 116; and a full screen button 118. A greater or lesser number of controls may be included in various implementations. The video player application 100 can provide a progress bar 106, which can be a graphical control element configured to visualize the progression of the digital video content item. The video player application 100 can provide an indication 114 of the current progress of the video and the overall duration of the video (e.g., current progress can be 0:56 seconds and the overall duration can be 6:23).

The video player application 100 can present can provide a banner content slot 120 that is spatially overlaid on the digital video content 102. However, in the illustrated example, the banner content slot 120 is overlaid on top of the video at a specified section with a specified size (e.g., 480×70) for a limited time because it obstructs a portion of the digital video content 102. The banner content slot 120 can obstruct a portion of the video, resulting in annoyance or frustration for users, and wasting processing resources rendering corresponding portions of the underlying obstructed video. Active portions of video frequently require more processing to decode and/or render, for example, due to frequently changing or detailed images that require finer macroblocks for decoding (e.g. text or motion); accordingly, rendering these portions and subsequently obscuring them with an overlay banner requires utilizing processing resources despite providing no observable benefit to the user.

Figure 2:
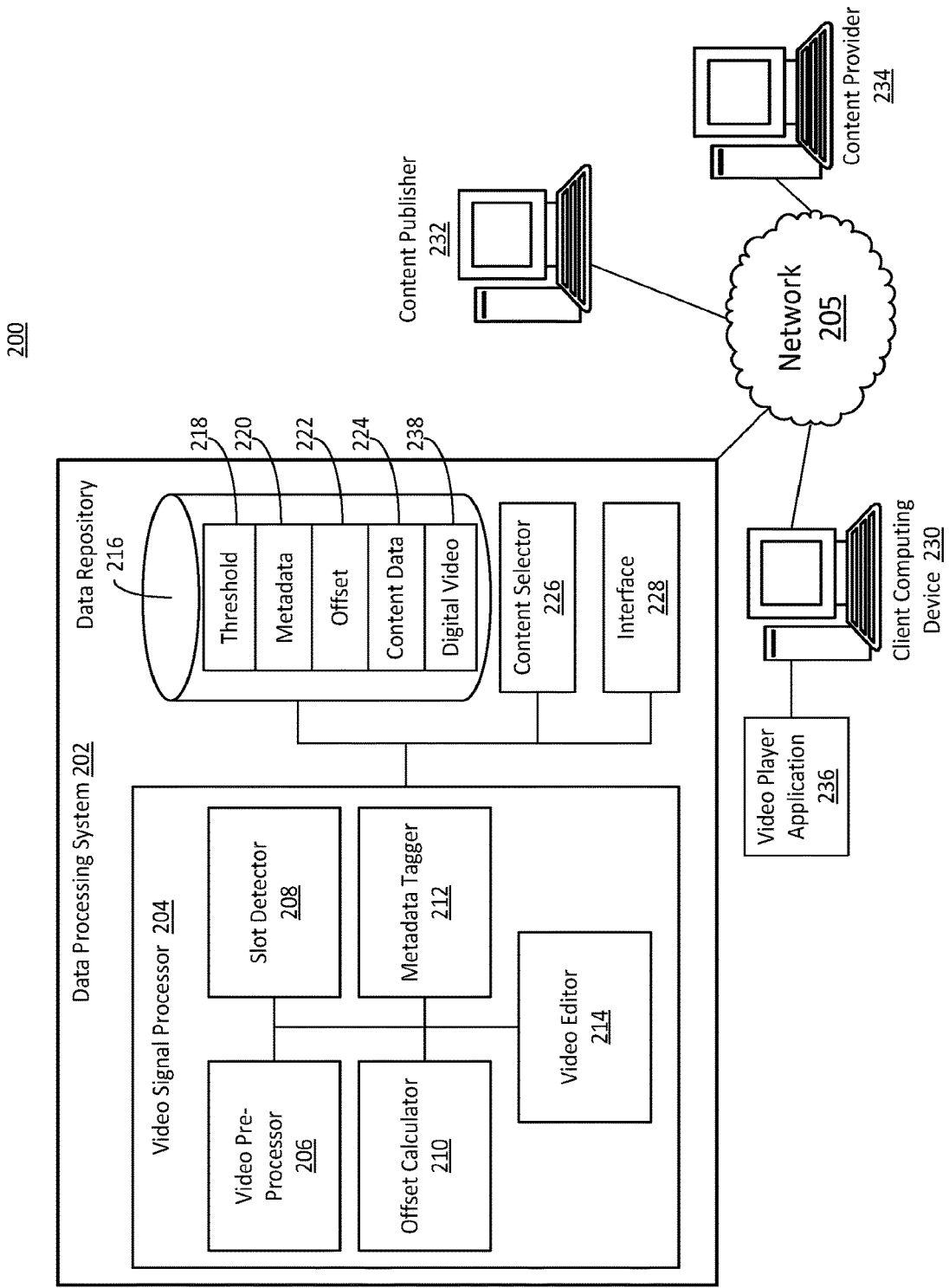
FIG. 2 is an illustration of a system for combining digital video, in accordance with an implementation.

In the present solution, a content publisher can upload the digital video content 102 to a data processing system (e.g., the data processing system 202 depicted in FIG. 2). The data processing system 202 can analyze the digital video content to identify blank or static spaces 122. The blank or static spaces 122 can correspond to static portions of the digital video content in which the pixels may not substantially vary for a predetermined duration or number of frames. For example, the pixels may be the same or vary less than a certain percent (e.g., 1%, 2%, 3%, 4%, 5%, 10%, etc.) relative to the pixels in the previous frame or the pixels in a region. The blank or static spaces 122 can represent a background or other region.

For example, the digital video content can be a news program. The news program can present a newscaster 104 that is in a generally fixed area in the digital video 102. The newscaster 104 can be surrounded by blank or static spaces 122, such as a surrounding border in a static color, furniture or a news set that is stationary, etc. Thus, the content publisher that created or presents digital video content 102 can upload the digital video content 102 to the data processing system 202, which can an analyze the digital video content item 102. Upon receiving the digital video content 102, the data processing system 202 can perform pre-processing, which can include converting the video to multiple formats, changing the resolution, or changing the frame rate.

Referring now to FIG. 1B, another illustration of an implementation of a display interface and system for combining or modifying digital video is shown. FIG. 1B illustrates operation of system 101 during which the content publisher 232 uploads the digital video content 102 to the data processing system 202 at step 140. The data processing system 202 can then analyze the digital video content 102. The data processing system 202 analyzes the digital video content 102 to identify candidate content slots 124, 126, 128, 130, 132 and 134 located at the blank spaces 122 indicated in FIG. 1A. The data processing system 202 can perform auto detection of candidate content slots.

The data processing system 202 can utilize image interpretation, image processing, machine learning or other techniques to identify the candidate content slots 124, 126, 128, 130, 132 and 134. For example, the data processing system 202 can identify one or more of the candidate content slots by comparing consecutive frames in the digital video content 102 to identify pixel variation below a threshold. The data processing system 202 can use machine learning to select one or more of the multiple candidate content slots based on historical performance or a prediction model. For example, the data processing system 202 can use a logistic regression to analyze the plurality of frames to identify the first static portion defined by the spatial region with matching pixels across two or more frames. The data processing system 202 can utilize a machine learning model or algorithm to select one or more of the multiple candidate slots. The data processing system can use a logistic regression, linear regression, artificial neural network, or other machine learning model or algorithm to identify candidate slots. For example, the data processing system 202 can receive performance feedback based on previously selected content slots to identify features associated with positive feedback and features associated with negative feedback. The data processing system 202 can use the positive feedback, negative feedback, and associated features to generate or build a machine learning model that the data processing system 202 can use to predict static regions in videos at which content slots can be placed to result in positive feedback. The data processing system 202 can further use the machine learning model to predict static regions in the video at which a content slot should not be placed based on a predicted negative performance.

The data processing system 202 can utilize an auto slot detection technique that includes removing one or more sections of the digital video 102 that include people (e.g., person 104), monuments, moving objects, or other predetermined objects. The auto slot detection technique can include comparing pixel by pixel for adjacent frames to identify common parts where the digital video 102 has a static background. The output of the auto slot detection algorithm can result in multiple candidate slots (e.g., multiple times and positions of the digital video 102 that has static background) as illustrated in FIG. 1B. For example, content slots 126, 130 and 134 can have static backgrounds at duration 142, whereas content slots 124, 128 and 132 can have a static background at duration 144.

Upon identifying the plurality of candidate content slots 124, 126, 128, 130, 132 and 134, the data processing system 202, using the auto slot detection technique, can filter out one or more of the candidate content slots that are close in proximity to people (e.g., person 104) or other changing or detailed parts (e.g. text, motion, etc.) in order to reduce distraction. The data processing system 202 can apply maximum/minimum rules to consolidate the multiple candidate slots into fewer candidate content slots to simply downstream processing, thereby improving efficiency of the downstream processing. For example, the candidate content slots 124, 128 and 132 can be consolidated into a maximum content slot 136; and the candidate content slots 126, 130 and 134 can be consolidated into a maximum content slot 138.

The data processing system 202, using the auto slot detection process, can forward the consolidated content slots (or regions) 136 and 138 to a machine learning algorithm to select the best content slots. The machine learning algorithm can utilize the following signals to select the best content slots: i) end users watching video—end users have an option to opt-out from these types of video content items and if they are opting out from a particular set of videos, the utilized slots may be presumed to be bad or non-optimal, and the corresponding signal can indicate the bad slot positions based on users opting out; ii) video uploader—the video uploader or user providing the video can reject some slot suggestions and accept some slot suggestions, so the signal can indicate statistically better slot positions based on whether the content publisher accepts the slot position, and bad slot positions based on whether the publisher rejected the slot position; iii) crowdsourced information—a crowdsourced rating system providing ground truth data for the machine learning algorithm to train on with explicit identifications of good and bad placement of content in slots (via positive and negative signals); iv) video supplemental content item serving—observe various metrics associated with rendered content items in content slots (e.g., performance, selection, user watch time reduction) to improve slot selection based on A/B testing, bucket testing, or split-run testing.

Thus, the data processing system 202 can utilize the auto slot detection technique, process or algorithm, which can include a machine learning algorithm, to automatically create a content slot in the digital video that corresponds to a static portion in the digital video. The data processing system 202 can determine a frame of the content slot (e.g., start time in the digital video for the content slot corresponding to a beginning of duration 142 or 144, coordinates for the content slot, surrounding color, background color, or duration of the content slot). For example, the data processing system 202 can determine a duration for each of the candidate content slot. The data processing system 202 can determine that each of the candidate content slots have the same duration or that one or more of the candidate content slots have different durations (e.g., durations 142 and 146). The data processing system 202 can set a duration for each of the candidate content slots based on a predetermined duration value or based on the duration that the pixels corresponding to the position of the candidate content slot remain static. The data processing system 202 can look frame by frame and identify where regions in the digital video are static or correspond to the same content (e.g., same pixels, no movement, etc.). The data processing system can apply further processing to exclude certain areas even though the area may not change, such as if the area already contains text (or contains more text than a predetermined threshold to prevent excluding areas with small amounts of text such as a broadcast station's call letters), has a color that is not conducive to providing a supplemental content item, includes faces, or other identifiable objects which are not to be overlaid by supplemental content items.

In some cases, the data processing system 202 can provide an indication to the content publisher of the candidate content slots. The data processing system 202 can prompt the content publisher to accept or reject one or more of the candidate content slots. In some cases, the content publisher can mark additional areas on the digital video content item as a candidate content slot. For example, the content publisher can mark a box 132 as a candidate content slot using a graphical user interface or other input mechanism (e.g., mouse, touch interface, or input coordinates).

The data processing system 202 can select one or more of the candidate content slots. The data processing system 202 can tag the digital video with information about the selected content slots. The data processing system 202 can include the information in the metadata of the digital video content 102. For example, the data processing system 202 can include locations for the content slots, background color, size, keywords, or a temporal offset. This information can facilitate subsequent content selection. For example, the background color may be useful for select a content item because the content item can include content selection criteria that may indicate a preference to be selected for display on a predetermined background color, or, on the other hand, not to be selected for display on a predetermined background color.

Figure 1C:
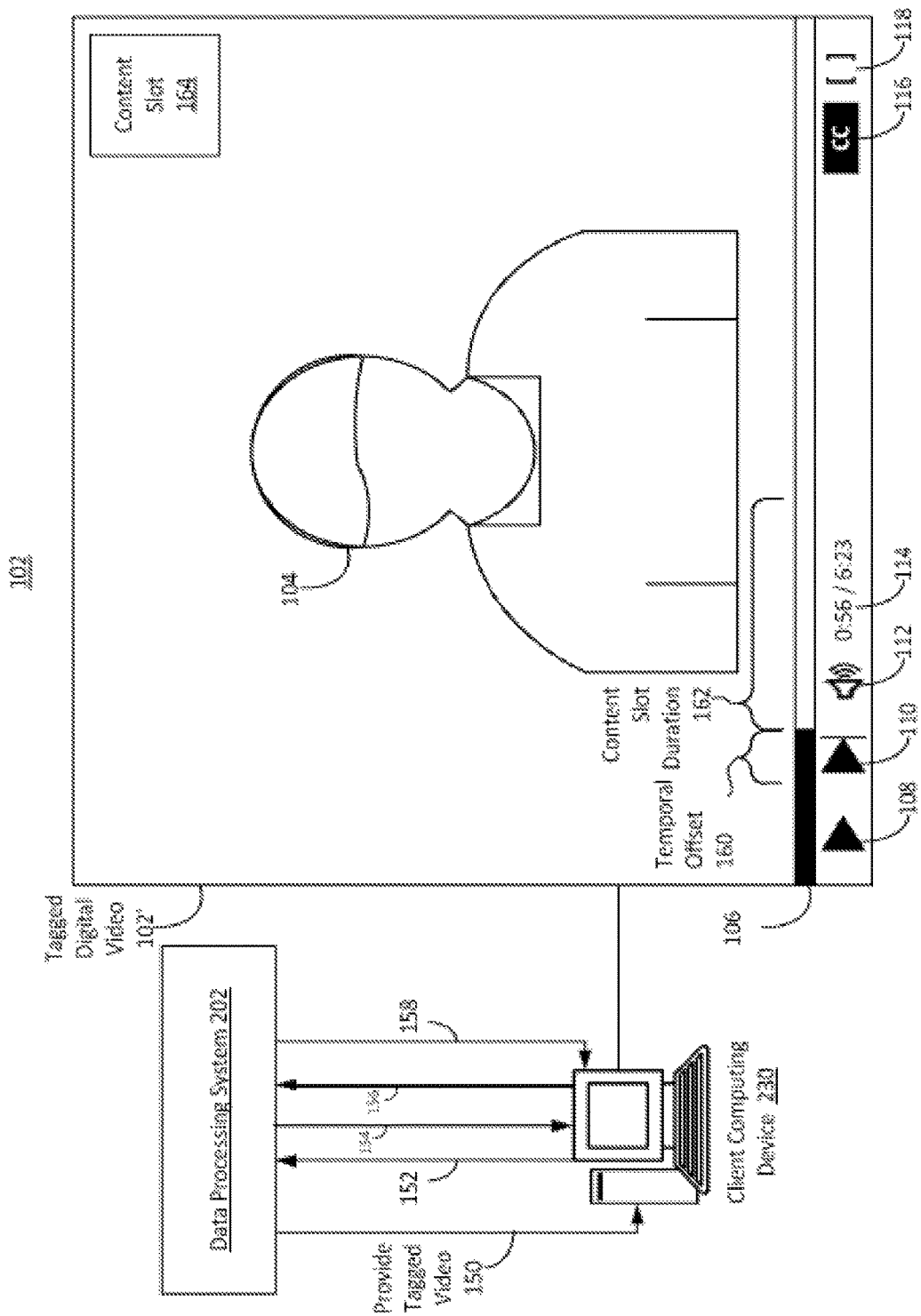

Referring now to FIG. 1C, another illustration of an implementation of a display interface and system for combining modifying digital video is shown. FIG. 1C illustrates operation of system 102 in which the data processing system 202 provides a tagged digital video 102' to a client computing device 230 at step 150. The tagged digital video 102' can include the information about the selected content slot (e.g., size, position, background color, etc.) and the temporal offset. The temporal offset 160 can refer to a time during playback prior to a subset of frames comprising the content slot. The temporal offset 160 can be a predetermined value, or can be dynamically determined based on characteristics associated with the digital video content 102', the client computing device 230, or a network (e.g., network 205 depicted in FIG. 2) through which the client computing device 230 and data processing system 202 communicate. The characteristic can include a buffering amount. For example, the more video content that is buffered or preloaded on the client computing device 230, the greater the temporal offset 160 can be to ensure that the supplemental content item is selected by the data processing system 202 and provided to the client computing device 230 along with the digital video content that is being preloaded or buffered on the client computing device 230.

In some implementations, when the client computing device 230 begins playback of the tagged digital video 102', the tag can include instructions to cause the client computing device 230 to send a request 152 to the data processing system 202 with information associated with the digital video content item 102' or the client computing device 230. The request 152 can include an identifier of the tagged digital video content item 102'. The request 152 can include metadata associated with the tagged digital video content item 102'. The data processing system 202 receives the request 152 from the client computing device 230 responsive to the client computing device 230 beginning playback of the tagged digital video content 102'. Responsive to the request 152, the data processing system 202 can identify whether the digital video content item 102' is eligible for immersive content slots based on the metadata received via the request 152 or based on performing a lookup in a database using the identifier received via the request 152.

In some implementations, when the client computing device 230 begins playing the tagged digital video 102', the client computing device transmit the request 152 along with information about the tagged digital video 102', device context, and device profile information. The data processing system 202 can fetch preprocessed metadata related to the tagged digital video 102' and determine that the tagged digital video 102' is eligible for an embedded content slot experience. The preprocessed metadata can also include information about the timing and positioning of the embedded content slot 164. For example, the data processing system 202 can store the metadata in a database associated with the data processing system 202. The metadata can be assigned an identifier of the tagged digital video 102'. During playback of the tagged digital video 102', the client computing device 230 can provide the identifier to the data processing system 202, and the data processing system 202 can perform a lookup using the received identifier in order to retrieve the metadata for the tagged digital video 102'. By storing the metadata at the data processing system 202, the client computing device 230 may only transmit the identifier for the tagged digital video content 102', thereby reducing bandwidth usage and reducing latency.

In some implementations, the data processing system 202 can transmit a response 154 to the client computing device 230 that includes information about where and when the immersive content slot is to be presented in digital video content item 102'. The client computing device 230, or video application player executing on the client computing device 230, can store the received information.

In some implementations, the tagged digital video content item 102' provided at step 150 can include this information in the metadata of the digital video 102', which can obviate the request and response steps 152 and 154, thereby reducing the number of remote procedures calls, network usage, and latency.

As the tagged digital video 102' progresses during playback, the video can progress to the beginning of the temporal offset 160. Progressing to the temporal offset 160 can trigger a request for content 156. Progressing to the temporal offset 160 can cause the client computing device 230 executing the video application player to transmit a request for content 156 to the data processing system 202. The request for content 156 can be transmitted based on the temporal offset 160, which occurs during playback prior to the content slot duration 162.

The data processing system 202 can receive the request for content 156 and execute a content selection process. The data processing system 202 can use information associated with the request to select the content item (e.g., background color of the content slot, keywords associated with the tagged digital video 102', position of content slot, size of content slot, or profile information associated with the client computing device 230, etc.). The data processing system 202 can provide the selected content item to the client computing device 230 via transmission 158. The data processing system 202 can further provide, during transmission 158, instruction to cause the client computing device 230 to insert, embed, merge, overlay, or otherwise render or present the selected content item in content slot 164. The selected content item can be rendered in content slot 164 for a content slot duration 162 (e.g., 30 seconds, 1 minute, 2 minutes, 3 minutes, or more).

The selected content item can be an image, such as a static image. The data processing system 202 can provide a data file comprising the static image corresponding to the selected content item to the client computing device 230.

The client computing device 230, or the video player application executing thereon, can render frames of the digital video content. As the video player application executing on the client computing device renders the frames of the digital video content, the video application player can merge the image corresponding to the selected content item received in the data file with the video frames at the specified location (e.g., in content slot 164) and for the specified duration 162. Thus, by providing the selected content item as a static image in a single transmission 158 and instructing the client computing device 230 to render the content item at a specific position and for a specified duration in each of the respective frames of the digital video, the system can reduce network utilization.

After the duration 162 is completed, video player application executed by the client computing device 230 can render the digital video 102' without the content slot 164. The video player application can wait for the next content slot where a content item can be shown as the video progresses.

Figure 1D:
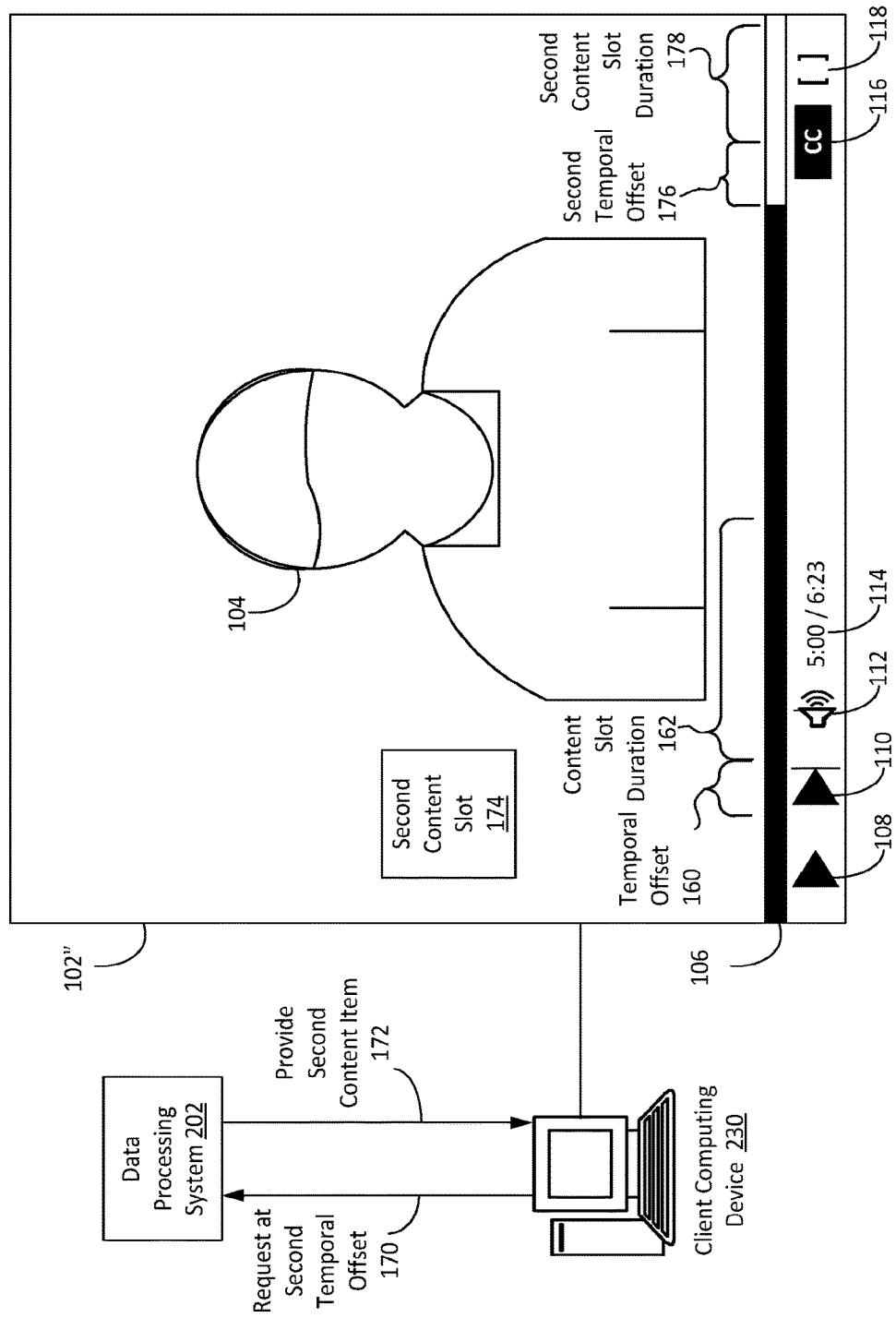

Referring now to FIG. 1D, another illustration of an implementation of a display interface and system for combining or modifying digital video is shown. FIG. 1D illustrates operation of system 102 in which a tagged digital video 102" includes a second content slot 174. The second content slot 174 can be associated with a second temporal offset 176 and a second content slot duration 178. The second temporal offset 176 and second content slot duration 178 can be subsequent to the temporal offset 160 and the content slot duration 162. The position and size of the second content slot 174 can be different than the position and size of the content slot 164. For example, content slot 164 can be positioned in a top, right corner of the digital video content 102', whereas the second content slot 174 can be positioned in a bottom, left corner of the tagged digital video content 102". The tagged digital videos 102' and 102" can be the same video at different presentation times, or different videos. The tagged digital video 102" can include both content slots 164 and 174, but at different presentation times. In some cases, both content slots 164 and 174 can be present at the same time or at overlapping times. For example, the second temporal offset 176 can occur during the content slot duration 162 in order to queue up a second content item for presentation in the content slot 174 while a content item is being presented during content slot duration 162 such that there is minimal latency.

Responsive to the tagged digital video 102" progressing to or playback reaching the second temporal offset 176, the client computing device 230 can transmit a request for content 170. The data processing system 202 can select a second content item and provide the second content item to the client computing device 230 during transmission 172. The data processing system 202 can select the second content item using information associated with the content request 170. The information can include information associated with the second content slot 174 or surrounding pixels (e.g., size, position, background color). The data processing system 202 can match the characteristics associated with the content slot with content selection criteria associated with a content item in order to select a matching content item.

FIG. 2 illustrates an example system 200 to combine or modify digital video. The system 200 can include content selection infrastructure. The system 200 can include a data processing system 202 communicating with one or more of a content provider computing device 234, content publisher computing device 232 or client computing device 230 via a network 205. The network 205 can include computer networks such as the Internet, local, wide, metro, or other area networks, intranets, satellite networks, and other communication networks such as voice or data mobile telephone networks. The network 205 can be used to access information resources such as web pages, web sites, domain names, or uniform resource locators that can be displayed on at least one computing device 230, such as a laptop, desktop, tablet, personal digital assistant, smart phone, portable computers, or mobile telecommunication device. For example, via the network 205 a user of the computing device 230 can access web pages provided by at least one web site operator or content publisher 232. A web browser (e.g., application 104) of the client computing device 230 can access a web server of the web site operator or content publisher 232 to retrieve a web page for display on a monitor of the computing device 230. The content publisher 232 can provide instructions to the application 104 executing on the computing device 230 to render the content. The web site operator or content publisher 232 generally includes an entity that operates the web page. The web site operator or content publisher 232 includes at least one web page server that communicates with the network 205 to make the web page available to the computing device 230. The data processing system 202 can provide instructions to the application 104 executing on the computing device 230 to render content.

The network 205 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 205 may include a wireless link, such as an infrared channel or satellite band. The topology of the network 205 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 200 can include at least one data processing system 202. The data processing system 202 can include at least one logic device such as a computing device having a processor to communicate via the network 205, for example with the computing device 230, the web site operator or content publisher computing device 232 (or content publisher 232), and at least one content provider computing device 234 (or provider device 234 or content provider 234). The data processing system 202 can include at least one computation resource, server, processor or memory. For example, the data processing system 202 can include a plurality of computation resources or servers located in at least one data center. The data processing system 202 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high-performance storage systems on localized high-performance networks. Centralizing the servers and storage systems and coupling them with advanced system management tools allows more efficient use of server resources.

The data processing system 202 can include a content placement system having at least one computation resource or server. The data processing system 202 can include or communicate with at least one content selector 226. The content provider device 234 can provide content, such as supplemental content items, that can include images, electronic documents, online documents, web pages, or text, and the data processing system 202 can provide the content items to the client computing device 230.

The data processing system 202 can include, access, interact with, or otherwise communicate with at least one content selector component 226, at least one interface 228, at least one video signal processor 204, and at least one data repository 216. The at least one video signal processor can include, access, interact with, or otherwise communicate with at least video pre-processor 206, slot detector 208, offset calculator 210, metadata tagger 212, or video editor 214. The at least one data repository 216 can include or store, in one or more data structures or databases, a threshold 218, metadata 220, a temporal offset 222, content data 224, or digital video 238. Content data 224 can include, for example, content campaign information, content groups, content selection criteria, content item objects or other information provided by a content provider 234 or obtained or determined by the data processing system 202 to facilitate content selection.

The video signal processor 204, video pre-processor 206, slot detector 208, offset calculator 210, metadata tagger 212, video editor 214, interface 228, or content selector 226 can each include at least one processing unit or other logic device such as programmable logic array engine, or module configured to communicate with the data repository 216. The video signal processor 204, video pre-processor 206, slot detector 208, offset calculator 210, metadata tagger 212, video editor 214, interface 228, and content selector 226 can be separate components, a single component, or part of the data processing system 202. The data processing system 202 and its components can include hardware elements, such as one or more processors, logic devices, or circuits.

The data processing system 202 can obtain anonymous computer network activity information associated with a plurality of computing devices 230. A user of a computing device 230 can affirmatively authorize the data processing system 202 to obtain network activity information corresponding to the user's computing device 230. For example, the data processing system 202 can prompt the user of the computing device 230 for consent to obtain one or more types of network activity information. The identity of the user of the computing device 230 can remain anonymous and the computing device 230 may be associated with a unique identifier (e.g., a unique identifier for the user or the computing device provided by the data processing system or a user of the computing device). The data processing system can associate each observation with a corresponding unique identifier.

The data processing system 202 can include, execute, or communicate with an interface 228, such as a networking interface, communication ports, input/output ports or graphical user interface with one or more input text boxes, buttons, drop down menus, widgets or other user interface elements. The data processing system 202 can provide the graphical user interface for rendering on a content provider device 234. The data processing system 202 can receive, via the graphical user interface, parameters or other information that facilitates a content selection process or establishing a content selection process.

The interface 228 of the data processing system can include a graphical user interface. The interface 228 can allow a content publisher 232 to upload a digital video. The interface 228 can allow a content publisher to provide additional input, such as mark boxes as candidate content slots for the digital video (e.g., candidate content slot 20 depicted in FIG. 1). The interface 228 of the data processing system 202 can forward or route data packets received from the content publisher device 232 to one or more component of the data processing system 202, such as the video signal processor 204 or data repository 216.

The interface 228 can include a network interface, user interface, input/output interface, communications port, a bus, or other software or hardware to receive information or instructions input via one or more input/output devices communicatively coupled to the client computing device 230, receive data packets via network 205, or transmit data via network 205. The interface 228 can include a graphical user interface, multi-touch interface, gesture-based interface, audio or voice based interface.

The interface 228 can provide data packets or information to a content provider device 234, content publisher device 232 or data processing system 202, and receive data packets or information from the content provider device 234, content publisher device 232 or data processing system 202.

The interface 228 can include, execute, or communicate with a graphical user interface with one or more input text boxes, buttons, drop down menus, widgets or other user interface elements. The data processing system 202 can provide the graphical user interface for rendering on the content provider device 234, content publisher device 232, or the client computing device 230. The data processing system 202 can receive, via the interface 228 of the computing device 230, parameters or other information that facilitates a content selection process. The interface 228 of can forward or route data packets received from one or more component of the client computing device 230 to components of the data processing system 202, the content provider device 234, or content publisher 232.

The content publisher 232 can provide digital video. The content publisher 232 can create the digital video. The content publisher 232 can create or provide multimedia content. For example, the content publisher can create a news program, documentary, show, movie, video clip, or other content. The content publisher 232 can transmit or upload the digital video to the data processing system 202 such that the data processing system 202 can stream or provide the digital video to client computing devices 230 for playback on the client computing devices 230.

The data processing system 202 can also communicate with the content provider device 234 via interface 228. For example, the interface 228 of the data processing system 202 can forward or route data packets received from the content provider device 234 to one or more component of the data processing system 202, such as the content selector component 226 or data repository 216. The data processing system 202 can include a network interface, user interface, input/output interface, communications port, a bus, or other software or hardware to provide data packets or information to a content provider device 234, content publisher device 216 or computing device 230, and receive data packets or information from the content provider device 234, content publisher device 216 or computing device 230.

The content provider 234 can provide one or more content item objects for selection by the data processing system 202. The data processing system 202 can select the content item objects when a content placement opportunity (e.g., automatically created content slot 164 or 174) becomes available that matches the budget, content schedule, maximum bids, keywords, and other selection criteria specified for the content group. Different types of content item objects can be included in a content group, such as a text content item, an image content item, video content item, audio content item, multimedia content item, call content item, content item link, interstitial content item, or a banner content item.

The client computing device 230 can include, execute, or communicate with a video player application 236. The video player application 236 can include or utilize hardware or software components. The video player application 236 can include, e.g., a web browser, mobile application, or media player. The video player application 236 can include a computer program that plays multimedia files such as digital videos, movies or music. The video player application 236 can be configured with one or more video codec that can compress or decompress the digital video. The video codec can convert video in a compressed format to a raw format for rendering or displaying via a display device communicatively coupled to the client computing device 230. Video codecs can include, for example, MPEG-2, which can refer to a standard for the coding of moving pictures and associated audio information.

The client computing device 230 can include one or more interfaces, which may be of the same or different types. The interface can include a network interface, user interface, input/output interface, communications port, a bus, or other software or hardware to receive information or instructions input via one or more input/output devices communicatively coupled to the client computing device 230, receive data packets via network 205, or transmit data via network 205. The interface 202 can include a graphical user interface, multi-touch interface, gesture-based interface, audio or voice based interface. The interface can include or interact with sensors, such as a location sensor (e.g., global positioning system, wireless transmissions, short-range wireless interconnection, near field communication, etc.), accelerometer, gyroscope, ambient light sensor, motion detector, ambient sound sensor, ambient temperature sensor, etc. The interface 202 can allow one or more components of the client computing device 230 to interact with one another.

The client computing device 230 can transmit a request for content for presentation via application 236 executing on the client device. The request can include information to facilitate content selection by the data processing system 202 (e.g., by content selector component 226). The application 236 running on the computing device 230 can generate the request and instruct the client computing device 230 to transmit the request to data processing system 202. The application 236 can generate the request responsive to an indication, interaction or trigger event. For example, the application 236 can generate the request responsive to a trigger or tag in a digital video being played or rendered by the application 236. The request can include or be associated with information that facilitate selecting digital content, such as content selection criteria, preferences, size of the content slot, width of the content slot, position of the content slot, size of the display, type of client computing device 230 (e.g., mobile device, desktop, tablet computing device), type of digital content (e.g., static, dynamic, images, text, video, audio), background color, foreground color, etc.

The data processing system 202 can include, execute, or otherwise communicate with a content selector component 226 to receive and select, based on the keyword, a content item via a real-time content selection process. The content selection process can refer to, or include, selecting sponsored content item objects provided by third party content providers 214. The real-time content selection process can include a service in which content items provided by multiple content providers are parsed, processed, weighted, or matched in order to select one or more content items to provide to the computing device 230. The content selector component 226 can perform the content selection process in real-time. Performing the content selection process in real-time can refer to performing the content selection process responsive to the request for content received via the client computing device 230. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 230, or within a time interval after the communication session is terminated.

For example, the data processing system 202 can include a content selector component 226 designed, constructed, configured or operational to select content item objects. To select content items for display, the data processing system 202 can use keywords to select a matching content item based on a matching technique. The candidate content items may include metadata indicative of the subject matter of the candidate content items, in which case the content selector component 226 may process the metadata to determine whether the subject matter of the candidate content item corresponds to the input keywords.

The content selector component 226 can select content item objects based on characteristics or metadata associated with the content slot in the digital video. The data processing system 202 (e.g., via video signal processor 204) can analyze the digital video to automatically detect a content slot as well as characteristics associated with the content slot that can facilitate the content selector component 226 selecting a content item for the content slot. Characteristics of the content slot can include, for example, size of the content slot, position of the content slot, duration of the content slot, background color of the content slot, types of objects surrounding the content slot, people proximate to the content slot, subject matter of the digital video, keywords associated with the digital video, text displayed on the digital video, etc.

For example, the data processing system 202 can receive, from computing device 230, one or more data packets comprising a request for content to be rendered in a content slot. The content slot can be presented by electronic display hardware via the video player application 236 executed by the computing device 230. Responsive to receiving the request, the data processing system 202 (e.g., via content selector component 226) can execute a real-time content selection process to identify a plurality of content items based on the one or more data packets. The content selector component 226 can identify the plurality of content items based on matching one or more criteria carried or indicated by the one or more data packets with one or more content selection criteria provided by the content provider 234. The criteria indicated by the one or more data packets can include information about the content slot on which the content item is to be rendered, information associated with application 104, information about the web page, or information associated with the computing device 230.

The data processing system 202 can include a video signal processor 204 designed and constructed to analyze a digital video provided by a content publisher 232, detect a slot in the digital video, and tag the digital video with metadata. The video signal processor 204 can include one or more hardware or software components, modules, or elements. The video signal processor 204 can include a video pre-processor 206. The video pre-processor 206 can receive a digital video uploaded by the content publisher 232 and perform an initial analysis of the digital video. The video pre-processor 206 can identify a format of the uploaded digital video. The video prep-processor 206 can convert the uploaded digital video to one or more additional video formats. For example, the video pre-processor 206 can convert the uploaded digital video from a first format into one or more additional formats suitable for playback on different types of client computing devices 230. The video pre-processor 206 can select the format to improve rending or playback efficiency by the client computing device 230. The video pre-processor 206 can select the format that reduces a data file size of the digital video in order to reduce bandwidth utilization. The video pre-processor can convert or modify the uploaded digital video by changing the resolution (e.g., 480p, which is made up of 480 lines stacked one on top of another, with each line being 852 pixels wide; 720p, which is made up of 720 lines that are each 1,280 pixels wide; etc.), or the frame rate (e.g., frames per second "fps" can refer to the frequency at which consecutive images or frames are displayed in an animated display).

The video pre-processor 206 can determine whether the uploaded digital video already exists in the data repository 216 and perform a deduplication process to reduce storage consumption in the data repository 216. The video pre-processor 206 can compare an identifier of the uploaded digital video with identifiers of digital videos already stored in the digital video data structure 238. The video pre-processor 206 can perform a lookup in the digital video data structure 238 using the identifier of the upload digital video. Responsive to identifying a match via the lookup, the video pre-processor 206 can determine to keep one of the previously stored digital videos corresponding to the identifier, or replace the previously stored digital video with the newly uploaded digital video. The video pre-processor 206 can determine to keep the original digital video or replace the original digital video based on characteristics associated with the digital video, such as quality of the digital video (e.g., frame rate or resolution), file size, or credentials of the content publisher 232. For example, the video pre-processor 206 can determine to keep the higher quality digital video (e.g., higher resolution or higher frame rate). In another example, the video pre-processor 206 can determine to keep the digital video provided by the authorized content publisher 232, such the content publisher 232 that created the digital video, as opposed to a content publisher 232 that may have copied the digital video.

The video pre-processor 206 can determine a characteristic of the uploaded digital video to determine whether the uploaded digital video is eligible for immersive content slot detection. Characteristics can include, for example, a frame rate, resolution, data file size, topic, type of digital video, genre, or video creation date. For example, the video pre-processor 206 can compare the frame rate of the uploaded digital video with a minimum frame rate threshold. If the frame rate is greater than or equal to the minimum frame rate threshold, then the video pre-processor 206 can determine that the uploaded digital video has a satisfactory frame rate. If, however, the frame rate is less than the minimum frame rate threshold, then the video pre-processor 206 can lock the digital video to prevent insertion of immersive content slots.

In some cases, the video pre-processor 206 can determine whether the uploaded digital video has been tagged with automatically detected content slots. The video pre-processor 206 can parse the metadata of the uploaded digital video to detect tagged content slots or a trigger. In the event the video pre-processor determines that the uploaded digital video has not been tagged with content slots, the video pre-processor 206 can provide the uploaded digital video to the slot detector 208. The video pre-processor 206, responsive to determining that the uploaded digital video lacks tags or metadata indicating a content slot, can instruct the slot detector 208 to automatically analyze the uploaded digital video to identify or detect one or more content slots using a slot detection technique. In some cases, the video pre-processor 206 may detect that the uploaded digital video has already been tagged with content slots and a trigger, but may determine to re-analyze the digital video to detect content slots.

The video signal processor 204 can include a slot detector 208 designed and constructed to analyze the digital video to detect a content slot. The slot detector 208 can be configured with a slot detection process, technique, or algorithm, such as any of those discussed above. For example, slot detector 208 may comprise an optical character recognition engine to identify text within one or more frames; a facial recognition system to identify the presence or absence of faces within one or more frames; a pixel comparator to identify regions of identical pixels within or between one or more frames; or any other type and form of system for detecting potential content slots. Upon detecting one or more content slots using the slot detection process, the slot detector 208 can use a machine learning model to select at least one content slot from the detected one or more content slots.

The uploaded digital video can include multiple frames. For example, if the duration of the uploaded digital video is 6 minutes and 23 seconds and the frame rate is 24 fps, then the total number of frames in the uploaded digital video can be 9,192 frames. The slot detector 208 can analyze the 9,192 frames to identify a first subset of consecutive frames that have a static portion. The static portion can be defined by a spatial region with matching pixels across the subset of the consecutive frames. For example, and as illustrated in FIG. 1B, the slot detector 208 can analyze the 9,192 frames in the digital video 102 to identify static regions 124, 126, 128, 130, 132, and 134.

In some cases, the slot detector 208 can determine not to analyze all 9,192 frames. Instead, and to reduce computing resource utilization and improve efficiency, the slot detector 208 can be configured to not generate content slots at certain time intervals in the video, such as at a beginning of the digital video or an end of the digital video. For example, the slot detector 208 can prevent the placement of immersive content slots in the first 30 seconds of the digital video and the last 30 seconds of the digital video. Thus, the slot detector may determine not to analyze frames in the first 30 seconds (e.g., the first 720 frames) or frames in the last 30 seconds (e.g., the last 720 frames), thereby preventing the analysis of 1,440 frames of the total 9,192 frames, which can bring about a 15% reduction in computing resource consumption.

The slot detector 208 can first detect various slot positions. To do so, the slot detector 208 can remove sections of the video that has people, monuments, or other objects that are not to be overwritten or replaced by a content slot. The slot detector 208 can use an image interpretation algorithm to identify pixels that correspond to a predetermined shape or object, such as a person, monument, or other non-alterable object in the video. The image interpretation algorithm can include digital image processing techniques that can identify that a person is in the image or identify certain objects in the image. The image interpretation algorithm can use pattern recognition, digital geometry, or signal processing to identify that a person is in the image or that a certain object is in the image.

The slot detector 208, upon identifying the person or objects, can determine the position in the image of the person or the object. The slot detector 208 can further identify the frames that include the person or the object. The slot detector 208 can then remove the regions in the frames that contain the person or the objects from being a candidate for a content slot. In some cases, the person or objects that are not to be overwritten or replaced may encompass a relatively large (e.g., greater than 70%, 80%, 90%, 95% or more) region of the frame. If, upon removing the person or objects from the frame, the remaining available region is less than a minimum slot size, then the slot detector 208 can remove the frame from further consideration, thereby reducing computing resource utilization in downstream processing. As shown in FIG. 1A, the slot detector 208 can identify the person 104, and then identify blank spaces 122 in the digital video 102 that do not contain the person 104.

After removing person or objects that are not to be overwritten, and identifying frames that contain sufficient remaining region for a content slot, the slot detector 208 can analyze the frames to identify a first subset of consecutive frames from the plurality of frames having a first static portion. The first static portion can be defined by a spatial region with matching pixels across two or more frames. For example, the slot detector 208 can compare pixel by pixel for adjacent frames to identify common parts or static regions where the digital video has a static background. Using this technique, the slot detector 208 can identify multiple static regions corresponding to different times and positions of the video that contain a static background or region. For example, the slot detector 208 using this algorithm can identify candidate content slots 124, 126, 128, 130, 132 and 134 depicted in FIG. 1B. In another example, the slot detector 208 can identify regions 136 and 138 as the static regions.

In some cases, the slot detector 208 can remove candidate content slots or adjust the sizes of the identified candidate slots in order to reduce distraction or interference with the person 104 or other objects in the digital video. For example, the slot detector 208 can smooth out edges that are close to the person 104 or other changing parts, resulting in the smaller candidate content slots 132 and 134, as depicted in FIG. 1B.

The slot detector 208, upon identifying the candidate content slots or static regions (e.g., 136 and 138 or 124, 126, 128, 130, 132 and 134), can input the static regions to a machine learning algorithm in order to sort or rank the static regions to select a content slot. The machine learning algorithm can use various signals to sort the static regions. For example, a first signal can be based on feedback from historical views of the digital video. If a majority of users opt-out of receiving supplemental content item for candidate content slot 124, but the majority of users opt-in to receiving supplemental content item for candidate content slot 126, then the machine learning model can determine that content slot 126 is to be scored or ranked higher than content slot 124.

A second signal can be based on feedback from content publisher devices 232. When the content publisher device 232 uploads the digital video, the data processing system 202 can provide an initial indication of candidate content slots (e.g., candidate content slots 124, 126, 128, 130, 132 or 134 as depicted in FIG. 1). The content publisher device 232 can then determine whether to accept or reject one or more of the candidate content slots. The data processing system 202 can track the accepted or rejected candidate slots and use the feedback to score or rank candidate content slots. For example, if a majority of content publisher devices 232 reject candidate content slot 124, but accept candidate content slot 126, the data processing system 202 can determine to rank candidate content slot 126 higher than candidate content slot 124.

A third signal used by the machine learning algorithm can include crowdsourced feedback. For example, the data processing system 202 can obtain feedback from several content publisher devices 232 or client computing devices 230 about the various candidate content slots. This feedback can form ground truth data for the machine learning algorithm to train on.

A fourth signal can be based on the performance of supplemental content items placed in the various content slots. The data processing system 202, content publisher 232, or content provider 234 can observe various metrics associated with served supplemental content items. Metrics can include the amount of time users watch a digital video with a specific candidate content slot as compared to the amount of time users watch the digital video without the candidate content slot or with a different candidate content slot. The data processing system 202 can track the reduction in viewing duration due to a content slot. For example, if content slot 124 reduced the average viewing duration of the digital video greater than the content slot 126, then the data processing system 202 can determine to score or rank content slot 126 higher than content slot 124.

The machine learning model can incorporate one or more of these signals or additional signals over time. As the machine learning model incorporates a larger data set, the machine learning algorithm can develop overtime to better score or rank the various candidate content slots. The slot detector 208 can select the top N ranking content slots for inclusion in the digital video.

The slot detector 208 can determine a duration of the content slot (e.g., a duration of the first static portion). The slot detector 208 can use various techniques to determine the duration of the first static portion. The slot detector 208 can determine the duration based on a beginning timestamp for the static portion and an ending timestamp for the static portion. The slot detector 208 can determine the duration of the static portion based on the number of frames in the first subset of consecutive frames that contain the static portion, multiplied by the frame rate. The slot detector 208 can compare the first duration of the static portion with a threshold to determine whether the first duration is eligible for insertion in the digital video.

If the first duration is less than the threshold, then the slot detector 208 can disregard the first content slot and proceed to selecting the second highest ranked content slot. The slot detector 208 can then determine the duration of the second highest ranked content slot and, responsive to the duration satisfying the thresholds, tag the digital video with the second content slot.

The data processing system 202 (e.g., via interface 228) can request authorization from the content publisher device 232 to overwrite an identified static portion. The content publisher device 232 can accept or reject the request, thereby authorizing or not authorizing the static portion for overwriting. In some cases, the data processing system 202 receives a negative authorization from the content publisher device 232 for the static portion. The negative authorization can cause the data processing system 202 to lock the static portion to prevent overwriting of the static portion with supplemental content provided by a third-party content provider device 234.

The video signal processor 208 can include an offset calculator designed and constructed to determine a temporal offset for the static portion or content slot. The temporal offset can indicate a time during playback prior to the first subset of consecutive frames containing the content slot at which the client computing device 230 (or video player application 236 thereof) is to transmit a request for content for the content slot. The temporal offset can range from a few seconds to several minutes. For example, the temporal offset can be 1 second, 2 seconds, 3 seconds, 4 seconds, 5 seconds, 10 seconds, 15 seconds, 30 seconds, 45 seconds, 60 seconds, 90 seconds, 2 minutes, 3 minutes or more.

The temporal offset can be a predetermined offset retrieved from the offset data structure 22. The offset data structure 222 can store several offsets. The offsets can map to a characteristic of the client computing device 230, digital video, or network 205. For example, a first offset can map to a mobile device, a second offset can map to a tablet device, a third offset can map to a high-resolution video, and a fourth offset can map to a cell network 205. In some cases, the temporal offset can be dynamically determined based on the speed of the network 205, the digital video buffer maintained by the video application player 236 executing on the client computing device 230, the current processor utilization of the data processing system 202 (e.g., if it is peak usage, then increase the temporal offset to allow for greater time in the processing queue and reduce latency), or the duration of the digital video.

The offset calculator 210 can determine the temporal offset based on the amount of digital video data being buffered by the video application player 236. The offset calculator 210 can determine the temporal offset based on the number of frames being preloaded in memory by the video application player 236. The temporal offset can be calculated such that the request for content is transmitted and the content selector 226 selects and returns a content item before the frame in which the select content item is to be inserted is buffered by the video application player 236. For example, if the video application player 236 is buffering 30 seconds of digital video (e.g., 720 frames at 24 fps), then the temporal offset can be 35 seconds to allow 5 seconds for the video application player to transmit the request for content and the data processing system 202 to select and return a content item for insertion in the content slot. For example, if the content slot appears at 56 seconds into to the digital video, and the temporal offset is 35 seconds, then the request for content can be transmitted from the client computing device 230 at 21 seconds into the digital video (e.g., temporal offset 160 depicted in FIG. 1C).

The video signal processor 204 can include a metadata tagger 212 designed and constructed to tag the digital video with information regarding the automatically detected content slot and the temporal offset used to trigger the request for content for the content slot. The metadata tagger 212 can update the metadata file associated with the digital video. The metadata tagger 212 can include additional information associated with the digital video or content slot, such as keywords, color, background color, color gradient, or font.

The metadata tagger 212 can tag the metadata of the digital video with information about the content slot. The metadata tagger 212 can generate a content slot data structure for each content slot. For example, the content slot data structure can include: content_slot_1{begin_timestamp, end_timestamp, temporal_offset, height, width, x-coordinate, y-coordinate, background color}. In another example, the content slot data structure can include: content_slot_1{begin_timestamp, duration, temporal offset, height, width, x-coordinate, y-coordinate}. The temporal offset can be stored as a presentation timestamp ("PTS") in a timestamp metadata field in an MPEG transport stream or MPEG program stream.

The metadata tagger 212 can insert information into the pre-existing metadata of the digital video. The metadata tagger 212 can append the information to the pre-existing metadata of the digital video. The metadata tagger 212 can replace at least a portion of the pre-existing metadata of the digital video. The metadata tagger 212 can add one or more fields to the metadata of the digital video. The metadata tagger 212 can include an instruction to cause the video player application 236 to transmit a request for content based on the temporal offset.

In some implementations, the video signal processor 204 can stream the digital video with tagged metadata to the client computing device 230. The client computing device 230 can play the digital video. The client computing device 230 can transmit a request for content to the data processing system 202 based on the temporal offset, receive a supplemental content item, and then render the received content item in the content slot indicated in the metadata of the digital video.

In some implementations, the video signal processor 204 includes a video editor 214. The video editor 214 can merge the selected content item into the content slot, and then transmit the modified frame to the client computing device 230 to cause the video player application 236 to render the entire frame with the selected content item already inserted in the content slot. The video editor 214 can continue to merge the selected content item into each frame for the duration of the content slot. Merging the selected content item by the data processing system 202 prior to transmitting the modified frame to the client computing device 230 can reduce computing resource consumption by the client computing device 230, as well as prevent the client computing device 230 (or software program executing on the client computing device 230) from intercepting the selected content item and blocking the selected content item from being rendered in the content slot.

The system 200 or one or more components or elements thereof, including, for example, the data processing system 202, video signal processor 204, content selector 226, interface 228, client computing device 230, content publisher device 232, or content provider device 234 can perform one or more function or aspect illustrated in FIGS. 1A-1D.

Figure 3:
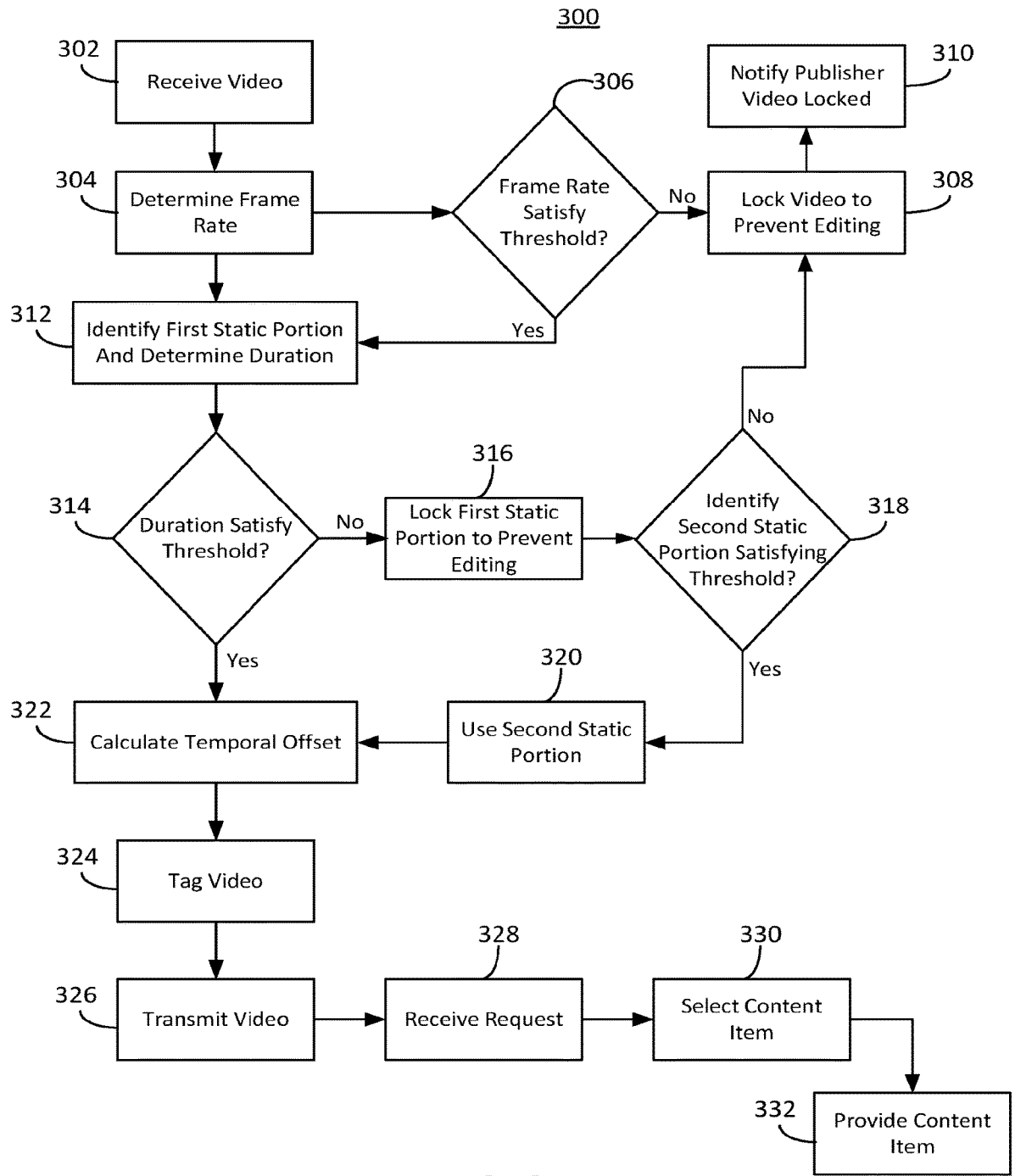
FIG. 3 is an illustration of a flowchart of a method for combining digital video, in accordance with an implementation.

FIG. 3 is a flowchart of an implementation of a method of combining or modifying digital video. The method 300 can include a computer-implemented method of combining or modifying digital video. The method 300 can be performed via one or more system or component illustrated in FIGS. 1A-1D, FIG. 2, or FIG. 4, including, for example, the data processing system 202, video signal processor 204, content selector 226, interface 228, client computing device 230, content publisher device 232, or content provider device 234. In brief overview, the method 300 can include a data processing system receiving a video at step 302. At step 304, the data processing system can determine a frame rate of the video. At step 306, the data processing system can determine whether the frame rate satisfies a threshold. If the frame rate does not satisfy the threshold, the data processing system can proceed to step 308. At step 308, the data processing system can lock the video to prevent editing, and then proceed to notify the publisher that the video is locked at step 310. If the frame rate satisfies the threshold, as determined at step 306, the data processing system proceeds to step 312 to identify a first static portion and determine a duration of the first static portion. The data processing system can then proceed to decision step 314 to determine whether the duration satisfies a threshold. If the data processing system determines the duration does not satisfy the threshold at step 314, then the data processing system can proceed to step 316 and lock the first static portion to prevent editing. The data processing system can then proceed to step 318 at which the data processing system can determine whether an identified second static portion satisfies the threshold. If the identified second static portion does not satisfy the duration threshold, the data processing system can proceed to step 308 and then step 310. If the identified second static portion satisfies the duration threshold, the data processing system can proceed to step 320 and determine to use the second static portion as the content slot. The data processing system can calculate a temporal offset for the second static portion at step 322. Also, if the data processing system determines the duration of the first static portion satisfies the duration threshold at step 314, the data processing system can proceed directly to step 322 and calculate the temporal offset for the first static portion. The data processing system can tag the video at step 324. The data processing system can transmit the video at step 326. The data processing system can receive a request at step 328. The data processing system can select a content item at step 330. The data processing system can provide the content item at step 332.

Still referring to FIG. 3, and in further detail, the method 300 can include a data processing system receiving a video at step 302. The video can be a digital video. The data processing system can receive the digital video from a content publisher device. The data processing system can provide a video uploader interface. The content publisher device can transfer, upload, or otherwise provide the digital video via an interface. The digital video can include multiple frames, where each frame can include image data. The digital video can include metadata or information about the digital video, such as a title. The digital video can be encoded using a video protocol. The digital video can be a 2-dimensional digital video, 3-dimensional digital video, animation, live action digital video, cartoon, in color, or monochromatic. The digital video can include audio or may be silent, in various implementations. In some implementations, the digital video may include a plurality of audio tracks (e.g. in different languages).

At step 304, the data processing system can determine a frame rate of the video. In some implementations, the data processing system can determine the frame rate based on the number of frames in the digital video and a duration of the digital video. For example, the frame rate can be the number of frames in the digital video divided by the duration of the digital video in seconds, resulting in the rate as frames per second. In some implementations, the data processing system can determine the frame rate based on the type of encoding or media protocol used to encode the digital video. In some implementations, the data processing system can determine the frame rate based on metadata information associated with the digital video (for example, an explicit identification of frame rate). In some implementations, the data processing system can determine additional information associated with the digital video, such as the resolution of the digital video, type of digital video, type of device for which the digital video is configured for playback, topic of the digital video, or duration of the digital video.

At step 306, the data processing system can determine whether the frame rate satisfies a threshold. The data processing system can retrieve a frame rate threshold from a data repository. The frame rate threshold can be 24 frames per second (fps), 12 fps, or any other such frame rate. The frame rate threshold can be lower than the frame rate at which the digital video is played back. For example, if the digital video includes drawn animation, the video can include 12 frames per second, but it can be played back at 24 fps where two consecutive frames include the same image. In other implementations, the media may be provided with a fewer number of frames per second than are played back, with the client device performing interpolation to re-generate removed frames. This may reduce data storage requirements and bandwidth requirements.

If the frame rate does not satisfy the threshold, the data processing system can proceed to step 308 and lock the video to prevent editing. The data processing system can determine to lock the video because the frame rate is unsatisfactory for supplemental content slots because the content slot may interfere with playback of the digital video. Locking the digital video can include tagging the metadata of the digital video to indicate that the digital video is not suitable for auto content slot detection and immersive content slots. Locking the digital video can include storing the identifier of the digital video in a data repository of the data processing system with an indication that the digital video is not suitable for auto content slot detection.

Upon locking the video for editing at step 308, the data processing system can proceed to notify the publisher that the video is locked at step 310. The data processing system can provide a prompt to the content publisher indicating the video is locked. The data processing system can provide an indication to the content publisher indicating the reason the digital video is locked, such as failing the frame rate check. The content publisher, responsive to receiving the indication of the failed frame rate check, may upload a second digital video with a satisfactory frame rate. The second digital video can be the same digital video but sampled at the suitable frame rate, or a different digital video.

If, at step 306, the data processing system determines that the digital video satisfies the frame rate check, the data processing system can proceed to step 312. At step 312, the data processing system can identify a first static portion and determine a duration of the first static portion. The data processing system can identify the first static portion based on using one or more of slot detection algorithms or machine learning algorithms. The data processing system can identify regions in frames of the digital video that are suitable for immersive content slots, and then score the identified regions to select one or more content slots.

For example, the data processing system can compare pixels in frames of the digital video to identify static portions based on the lack of pixel variation across frames, and then mark the static region as a content slot. If there are multiple content slots, the data processing system can use a machine learning model to score the multiple content slots. The data processing system can rank the content slots based on the score (e.g., a first content slot, a second content slot, and a third content slot). The data processing system can then select the top-ranking content slot (e.g., the first content slot) for insertion into the digital video.

The data processing system can then proceed to decision step 314 to determine whether the duration of the first content slot satisfies a duration threshold. The first content slot can include a start timestamp and end timestamp (or duration). The duration can correspond to the number of frames comprising the static region corresponding to the first content slot. For example, if the static region corresponding to the first content slot is present in 720 consecutive frames of the digital video, and the frame rate is 24 fps, then the duration of the first content slot is 30 seconds (e.g., 720 frames divided by 24 fps equals 30 seconds).

The data processing system can retrieve the duration threshold from the data repository. The data processing system can use a predetermined duration threshold. The data processing system can use a dynamic duration threshold that can vary based on characteristics associated with the digital video (e.g., duration, frame rate, quality, resolution, topic, color, etc.). The duration threshold can be a percentage or ratio of the duration of the digital video. For example, the duration threshold can be 5%, 10%, 15%, 20%, 25%, 30% or more of the duration of the digital video. The duration threshold can include a minimum duration and a maximum duration. The maximum duration can be 60 seconds, 90 seconds, 120 seconds. If the duration of the content slot exceeds the maximum duration, the data processing system can trim or cut the duration of the content slot.

If the data processing system determines that the duration of the first content slot satisfies the duration threshold, the data processing system can proceed to calculate the temporal offset at step 322. If, however, the data processing system determines the duration does not satisfy the threshold at step 314, then the data processing system can proceed to step 316 and lock the first static portion to prevent editing. The data processing system can then proceed to step 318 at which the data processing system can determine whether an identified second content slot satisfies the threshold. The second content slot can be the second ranking content slot based on the scores determined based the machine learning model. If the identified second static portion does not satisfy the duration threshold, in some implementations, the data processing system can proceed to step 308 and then step 310. If the identified second static portion satisfies the duration threshold, the data processing system can proceed to step 320 and determine to use the second content slot instead of the first content slot. Although shown only testing two static portions, in many implementations, steps 312-320 may be repeated iteratively for each of a plurality of additional identified static portions until identifying a static portion exceeding the required threshold or identifying no further static portions.

At step 322, the data processing system can calculate a temporal offset for the content slot (e.g., one of the first content slot or the second slot based on the outcome of satisfying the duration threshold at step 314). The data processing system can compute the temporal offset during playback of the digital video prior to the start timestamp of the content slot. The temporal offset can be calculated to reduce or eliminate latency in selecting and providing a content item for rendering in the content slot. The temporal offset can be calculated based on buffering metrics for the digital video, resolution of the digital video, network characteristics, duration of the digital video, etc.

The data processing system can tag the video at step 324. The data processing system can tag the digital video with an indication of the content slot. The data processing system can tag the digital video with the content slot data structure, which can include an indication of the subset of consecutive frames having the static portion corresponding to the content slot. The data processing system can tag the digital video with a trigger that causes transmission of a request for content at the calculated temporal offset calculated. The content slot data structure can include, for example: {start timestamp, duration, temporal offset, size, position}.

The data processing system can transmit the video at step 326. The data processing system can provide the digital video to a client device. The client device can request the digital video from the data processing system. The client device may have accessed a webpage that includes a link or pointer to the digital video. The digital video can be embedded in the webpage accessed by the client device. The data processing system can provide the digital video content with the indication of the content slot and the trigger. Receipt of the digital video content item can cause the client device to render the digital video content item, parse the indication to identify the first subset of consecutive frames, and transmit, at the temporal offset during playback prior to the first subset of consecutive frames, the request for content responsive to execution of the trigger.

The data processing system can receive a request at step 328. The data processing system can receive the request from the client device. The client device can transmit the request at approximately (e.g., 10%) the temporal offset. Responsive to receiving the request for content, the data processing system can select a content item at step 330. The data processing system can provide the content item to the client device at step 332. The client device can render the content item in the content slot for the duration for the content slot. The client device may only receive the content item once for the duration of the content slot, thereby reducing network bandwidth usage and remote procedure calls. For example, the content item can be rendered in the content slot 720 times corresponding to the 720 consecutive frames, but the content item may only be transmitted from the data processing system to the client computing device once, thereby providing an improvement.

After the duration of the content slot is over, the client device can terminate the content slot, and remove or erase the content item. The client device can wait until a second content slot begins, and transmit a second request for content at a second temporal offset corresponding to the second content slot.

Figure 4:
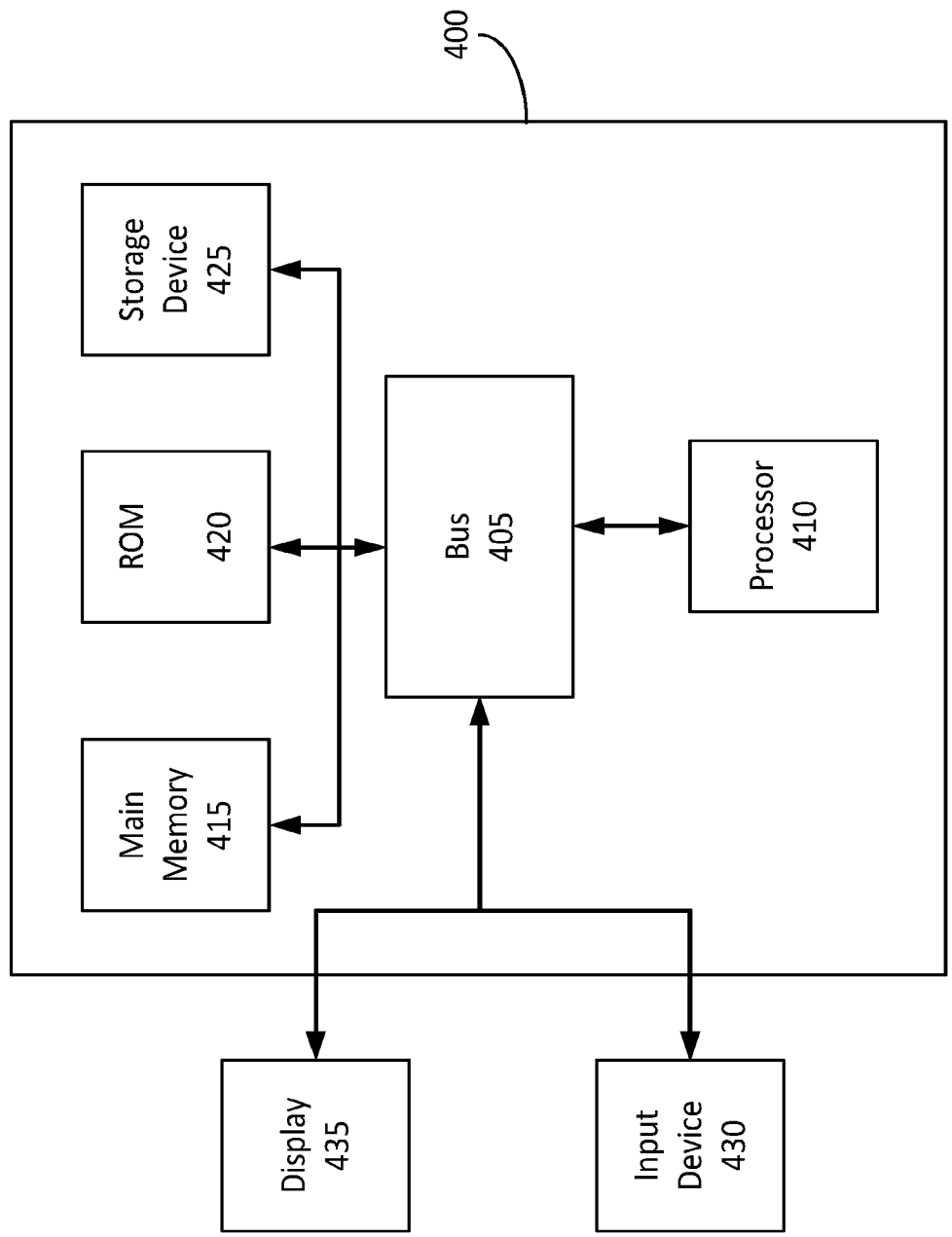
FIG. 4 is a block diagram illustrating an implementation of an architecture for a computer system that may be employed to implement various elements of the systems shown in FIGS. 1A-1D and 2, and the method shown in FIG. 3.

FIG. 4 is a block diagram of an example computer system 400. The computer system or computing device 400 can include or be used to implement the system 200, or its components such as the data processing system 202. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 104. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 104.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 202, the client computing device 150 or other component of FIG. 2, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content selector component 226, dynamic content server 130, static content server 132 and other data processing system 202 components can include or share one or more data processing apparatuses, systems, computing devices, or processors. Further, the interface 228, video signal processor 204, content selector 226, video pre-processor 206, slot detector 208, offset calculator 210, metadata tagger 212, video editor 214, and data repository 216, or other client computing device 230 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 202) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 200 or system 400 can include clients and servers. A client and server are generally remote from each other and typically interact through a communication network (e.g., the network 205). The relationship of client and server arises by virtue of computer programs running on the respective computers and having a client-server relationship to each other. A server can transmit data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 202 from the computing device 230 or the content provider computing device 234 or the content publisher device 232).

Thus, aspects of the present disclosure are directed to systems and methods of modifying digital video content. For example, the systems and methods may combine video content. For example, the method can be performed by a data processing system that includes or executes a video signal processor and a content selector. The method can include the data processing system receiving, from a publisher device, a digital video content item including a plurality of frames. The video signal processor can determine a frame rate of the digital video content item. The video signal processor can analyze the plurality of frames to identify a first subset of consecutive frames from the plurality of frames having a first static portion. The first static portion can be defined by a spatial region with matching pixels across two or more frames. The video signal processor can determine, based on a number of frames in the first subset of consecutive frames and the frame rate, a first duration of the first static portion. The video signal processor can compare the first duration of the first static portion with a threshold. The video signal processor can tag the digital video content item with an indication of the first subset of consecutive frames and a trigger. The video signal processor can tag the digital video content item responsive to the first duration of the first static portion being greater than or equal to the threshold. The trigger can cause transmission of a request for content used to overwrite the first static portion. The trigger can cause the transmission of the request at a temporal offset during playback prior to the first subset of consecutive frames. The video signal processor can provide, to a client device, the digital video content item with the indication and the trigger. The receipt of the digital video content item by the client device can cause the client device to render the digital video content item, parse the indication to identify the first subset of consecutive frames, and transmit, at the temporal offset during playback prior to the first subset of consecutive frames, the request for content responsive to execution of the trigger. The video signal processor can receive the request, which was transmitted by the client device based on the temporal offset during playback prior to the first subset of consecutive frames. A content selector executed by the data processing system can select a content item responsive to the request for content received from the client device. The data processing system can transmit, to the client device, the content item, the receipt of which by the client device can cause the client device to render the content item at the first static portion of the first subset of consecutive frames.

In some implementations, the publisher device and the data processing system may comprise different devices. In other implementations, the publisher device may be part of the data processing system. For example, in some implementations, the publisher device and the data processing system may execute on the same device. Receiving the digital video content item may comprise loading the digital video content item from memory or storage.

In some implementations, the data processing system analyzes the frames to identify a second static portion in the first subset of consecutive frames. The data processing system can identify a first parameter associated with the first static portion and a second parameter associated with the second static portion. The data processing system can select, based on a comparison of the first parameter and the second parameter, the first static portion for tagging. In some implementations, the first parameter includes at least one of a background color, color gradient, size, or location. The second parameter can include at least one of a background color, color gradient, size, or location.

In some implementations, the data processing system can analyze the plurality of frames to identify a second static portion in the first subset of consecutive frames. The data processing system can identify a second duration of the second static portion. The data processing system can select the first static portion for tagging based on the first duration exceeding the second duration.

In some implementations, the data processing system can identify a second static portion in the digital video content item. The data processing system can request, from the publisher device, authorization to overwrite the second static portion. The data processing system can receive a negative authorization from the publisher device for the second static portion. The data processing system can lock the second static portion to prevent overwriting of the second static portion with content selected by the data processing system.

In some implementations, the data processing system can identify the first static portion based on pixel variation across consecutive frames in the plurality of frames. In some implementations, the data processing system can receive an indication of a background color from the publisher device to control identification of the first static portion. The data processing system can identify, using the indication of the background color, the first static portion based on a pixel characteristic across consecutive frames in the plurality of frames.

In some implementations, the data processing system can identify one or more characteristics associated with the first static portion. The one or more characteristics can include at least one of text, font, face, object type, or color. The data processing system can select the content item based on the one or more characteristics associated with the first static portion.

In some implementations, the data processing system can identify an amount of the digital video content item that is preloaded into memory of the client device. The data processing system can set the temporal offset based on the amount to cause the client device to transmit the request for content prior to the amount being preloaded into the memory of the client device.

In some implementations, the data processing system can merging, by the data processing system, the content item at the first static portion of the first subset of consecutive frames of the digital video content item. The data processing system can transmit, to the client device, the first subset of consecutive frames of the digital video content item merged with the content item to cause the client device to render the content item.

At least one aspect is directed to a system for modifying digital video content. The system can include a data processing system. The data processing system can include at least one processor and memory. The data processing system can execute a video signal processor and a content selector. The video signal processor can receive, from a publisher device, a digital video content item comprising a plurality of frames. The video signal processor can determine a frame rate of the digital video content item. The video signal processor can analyze the plurality of frames to identify a first subset of consecutive frames from the plurality of frames having a first static portion. The first static portion can be defined by a spatial region with matching pixels across two or more frames. The video signal processor can determine, based on a number of frames in the first subset of consecutive frames and the frame rate, a first duration of the first static portion. The video signal processor can compare the first duration of the first static portion with a threshold. The video signal processor can tag, the digital video content item with an indication of the first subset of consecutive frames and a trigger. The video signal processor can perform this tagging responsive to the first duration of the first static portion being greater than or equal to the threshold. The trigger can cause the transmission of a request for content used to overwrite the first static portion. The request can be transmitted at a temporal offset during playback prior to the first subset of consecutive frames. The video signal processor can provide, to a client device, the digital video content item with the indication and the trigger. The receipt of the digital video content item by the client device can cause the client device to render the digital video content item, parse the indication to identify the first subset of consecutive frames, and transmit, at the temporal offset during playback prior to the first subset of consecutive frames, the request for content responsive to execution of the trigger. The content selector component can receive the request for content from the client device. The client device transmitted the request based on the temporal offset during playback prior to the first subset of consecutive frames. The content selector component can select a content item responsive to the request for content received from the client device. The dps can transmit the content item to the client device. The client device can receive the content item. Receipt of the content item by the client device can cause the client device to render the content item at the first static portion of the first subset of consecutive frames.

In some implementations, the video signal processor analyzes the plurality of frames to identify a second static portion in the first subset of consecutive frames. The video signal processor can identify a first parameter associated with the first static portion and a second parameter associated with the second static portion. The video signal processor can select, based on a comparison of the first parameter and the second parameter, the first static portion for tagging. In some implementations, the first parameter includes at least one of a background color, color gradient, size, or location. The second parameter can include at least one of a background color, color gradient, size, or location.

In some implementations, the video signal processor can analyze the plurality of frames to identify a second static portion in the first subset of consecutive frames. The video signal processor can identify a second duration of the second static portion. The video signal processor can select the first static portion for tagging based on the first duration exceeding the second duration.

In some implementations, the video signal processor can identify a second static portion in the digital video content item. The video signal processor can request, from the publisher device, authorization to overwrite the second static portion. The video signal processor can receive a negative authorization from the publisher device for the second static portion. The video signal processor can lock the second static portion to prevent overwriting of the second static portion with content selected by the data processing system.

In some implementations, the video signal processor can identify the first static portion based on pixel variation across consecutive frames in the plurality of frames. In some implementations, the video signal processor can receive an indication of a background color from the publisher device to control identification of the first static portion. The video signal processor can identify, using the indication of the background color, the first static portion based on a pixel characteristic across consecutive frames in the plurality of frames.

In some implementations, the content selector identifies one or more characteristics associated with the first static portion. The one or more characteristics can include at least one of text, font, face, object type, or color. The content selector can select the content item based on the one or more characteristics associated with the first static portion.

In some implementations, the video signal processor can identify an amount of the digital video content item that is preloaded into memory of the client device. The video signal processor can set the temporal offset based on the amount to cause the client device to transmit the request for content prior to the amount being preloaded into the memory of the client device.

In some implementations, the video signal processor can merge the content item at the first static portion of the first subset of consecutive frames of the digital video content item. The video signal processor can transmit, to the client device, the first subset of consecutive frames of the digital video content item merged with the content item to cause the client device to render the content item.

In some implementations, the video signal processor can use a logistic regression to analyze the plurality of frames to identify the first static portion defined by the spatial region with matching pixels across two or more frames.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the video pre-processor 206, content selector 206 or video editor 214 can be a single component, app, or program, or a logic device having one or more processing circuits, or part of one or more servers of the data processing system 202.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of combining digital video content, comprising:
   identifying, by the data processing system, a first static portion in a consecutive subset of a consecutive plurality of frames in a digital video content item;
   tagging, by the data processing system, the digital video content item with instructions that cause transmission of a request for content used to overwrite the first static portion; and
   providing, by the data processing system to a client device, the digital video content item with the instructions, wherein the digital video content item, when displayed by the client device, causes the client device to execute the instructions and transmit the request for content used to overwrite the first static portion.

2. The method of claim 1, comprising:
   analyzing, by the data processing system, the plurality of frames to identify a second static portion in the consecutive subset of the consecutive plurality of frames;
   identifying, by the data processing system, a first parameter associated with the first static portion and a second parameter associated with the second static portion; and
   selecting, based on a comparison of the first parameter and the second parameter, the first static portion for tagging.

3. The method of claim 2, wherein the first parameter comprises at least one of a background color, color gradient, size, or location; and the second parameter comprises at least one of a second background color, color gradient, size, or location.

4. The method of claim 1, comprising:
   analyzing, by the data processing system, the plurality of frames to identify a second static portion in the consecutive subset of the consecutive plurality of frames;
   identifying, by the data processing system, a second duration of the second static portion; and
   selecting, by the data processing system, the first static portion for tagging based on the first duration exceeding the second duration.

5. The method of claim 1, comprising:
   identifying, by the data processing system, a second static portion in the digital video content item;
   requesting, by the data processing system from the publisher device, authorization to overwrite the second static portion;
   receiving, by the data processing system, a negative authorization from the publisher device for the second static portion; and
   locking, by the data processing system, the second static portion to prevent overwriting of the second static portion with content selected by the data processing system.

6. The method of claim 1, comprising identifying, by the data processing system, the first static portion based on pixel variation across consecutive frames in the plurality of frames.

7. The method of claim 1, comprising:
   receiving, by the data processing system, an indication of a background color from the publisher device to control identification of the first static portion; and
   identifying, by the data processing system using the indication of the background color, the first static portion based on a pixel characteristic across consecutive frames in the plurality of frames.

8. The method of claim 1, comprising:
   identifying, by the data processing system, one or more characteristics associated with the first static portion, the one or more characteristics comprising at least one of text, font, face, object type, or color; and
   selecting, by the data processing system, the content item based on the one or more characteristics associated with the first static portion.

9. The method of claim 1, comprising:
   identifying, by the data processing system, an amount of the digital video content item that is preloaded into memory of the client device; and
   setting, by the data processing system, a temporal offset for the digital video content item based at least in part on the amount to cause the client device to transmit the request for content prior to the amount being preloaded into the memory of the client device.

10. The method of claim 1, comprising:
    merging, by the data processing system, the content item at the first static portion of the consecutive subset of the consecutive plurality of frames of the digital video content item; and
    transmitting, by the data processing system to the client device, the consecutive subset of the consecutive plurality of frames of the digital video content item merged with the content item to cause the client device to render the content item.

11. A system for combining digital video content, comprising:

a data processing system comprising one or more processors coupled to memory, the data processing system configured to:

identify a first static portion in a consecutive subset of a consecutive plurality of frames in a digital video content item;

tag the digital video content item with instructions that cause transmission of a request for content used to overwrite the first static portion; and provide, to a client device, the digital video content item with the instructions, wherein the digital video content item, when displayed by the client device, causes the client device to execute the instructions and transmit the request for content used to overwrite the first static portion.

12. The system of claim 11, wherein the data processing system is further configured to:

analyze the plurality of frames to identify a second static portion in the consecutive subset of the consecutive plurality of frames;

identify a first parameter associated with the first static portion and a second parameter associated with the second static portion; and select, based on a comparison of the first parameter and the second parameter, the first static portion for tagging.

13. The system of claim 12, wherein the first parameter comprises at least one of a background color, color gradient, size, or location; and the second parameter comprises at least one of a second background color, color gradient, size, or location.

14. The system of claim 11, wherein the data processing system is further configured to:

analyze the plurality of frames to identify a second static portion in the consecutive subset of the consecutive plurality of frames;

identify a second duration of the second static portion; and select the first static portion for tagging based on the first duration exceeding the second duration.

15. The system of claim 11, wherein the data processing system is further configured to:

identify a second static portion in the digital video content item;

request, from the publisher device, authorization to overwrite the second static portion;

receive a negative authorization from the publisher device for the second static portion; and lock the second static portion to prevent overwriting of the second static portion with content selected by the data processing system.

16. The system of claim 11, wherein the data processing system is further configured to identify the first static portion based on pixel variation across consecutive frames in the plurality of frames.

17. The system of claim 11, wherein the data processing system is further configured to:

receive an indication of a background color from the publisher device to control identification of the first static portion; and identify, using the indication of the background color, the first static portion based on a pixel characteristic across consecutive frames in the plurality of frames.

18. The system of claim 11, wherein the data processing system is further configured to:

identify one or more characteristics associated with the first static portion, the one or more characteristics comprising at least one of text, font, face, object type, or color; and select the content item based on the one or more characteristics associated with the first static portion.

19. The system of claim 11, wherein the data processing system is further configured to:

identify an amount of the digital video content item that is preloaded into memory of the client device; and set a temporal offset for the digital video content item based at least in part on the amount to cause the client device to transmit the request for content prior to the amount being preloaded into the memory of the client device.

20. The system of claim 11, wherein the data processing system is further configured to:

merge the content item at the first static portion of the consecutive subset of the consecutive plurality of frames of the digital video content item; and transmit, to the client device, the consecutive subset of the consecutive plurality of frames of the digital video content item merged with the content item to cause the client device to render the content item.

21. The system of claim 11, wherein the data processing system is configured to utilize a machine learning model to identify the first static portion based on analyzing the consecutive subset of the consecutive plurality of frames in the digital video content item.

22. The system of claim 21, wherein the machine learning model is one of a logistic regression, a linear regression, or an artificial neural network.

23. The system of claim 21, wherein the machine learning model is generated based on positive and negative feedback associated with previously identified static portions in previous consecutive pluralities of frames, to predict static portions in consecutive pluralities of frames that will be associated with positive feedback or negative feedback.

24. The system of claim 23, wherein the positive feedback includes one or more of: users not opting out of digital video content including the static portions, publishers accepting the digital video content including the static portions, or a positive rating of the digital video content including the static portions.

25. The system of claim 23, wherein the negative feedback includes one or more of: users opting out of digital video content including the static portions, publishers not accepting the digital video content including the static portions, or a negative rating of the digital video content including the static portions.

26. The system of claim 11, wherein the data processing system is configured to utilize a machine learning model to select the first static portion for tagging by ranking the first static portion and the second static portion based on the first parameter and the second parameter.

* * * * *